Jan. 20, 1959

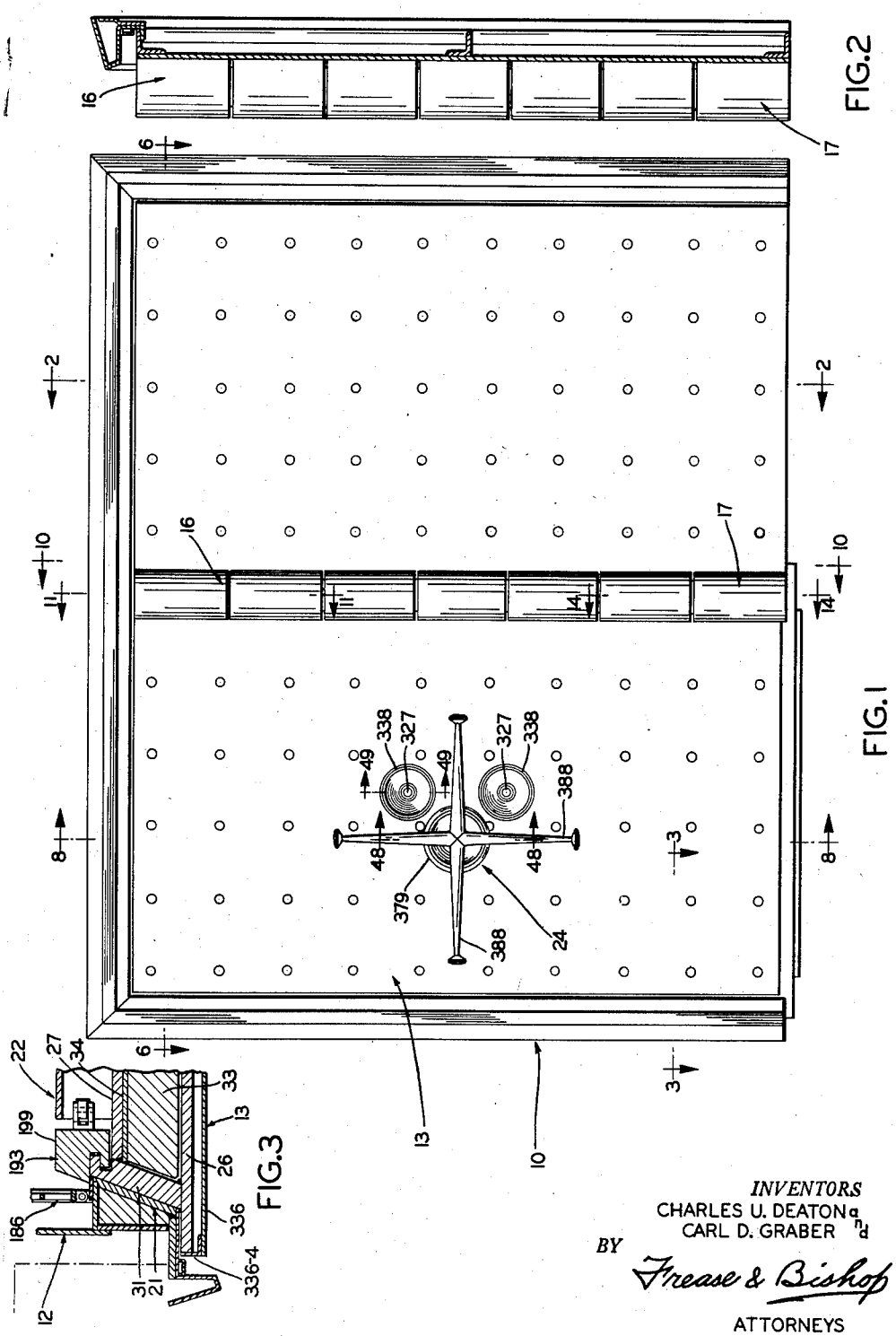

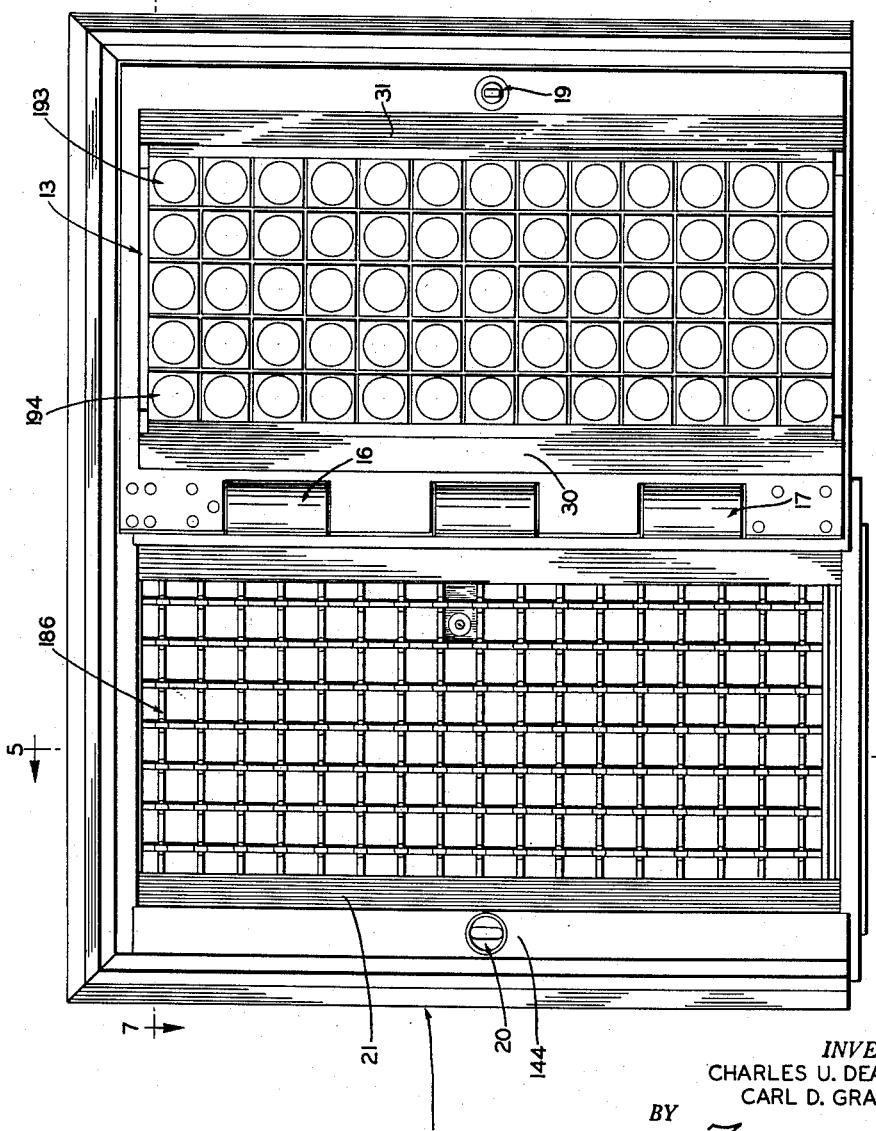

C. U. DEATON ET AL 2,869,485

VAULT DOOR CONSTRUCTION

Filed Aug. 3, 1954

INVENTORS
CHARLES U. DEATON and
CARL D. GRABER

BY

*Frease & Bishop*

ATTORNEYS

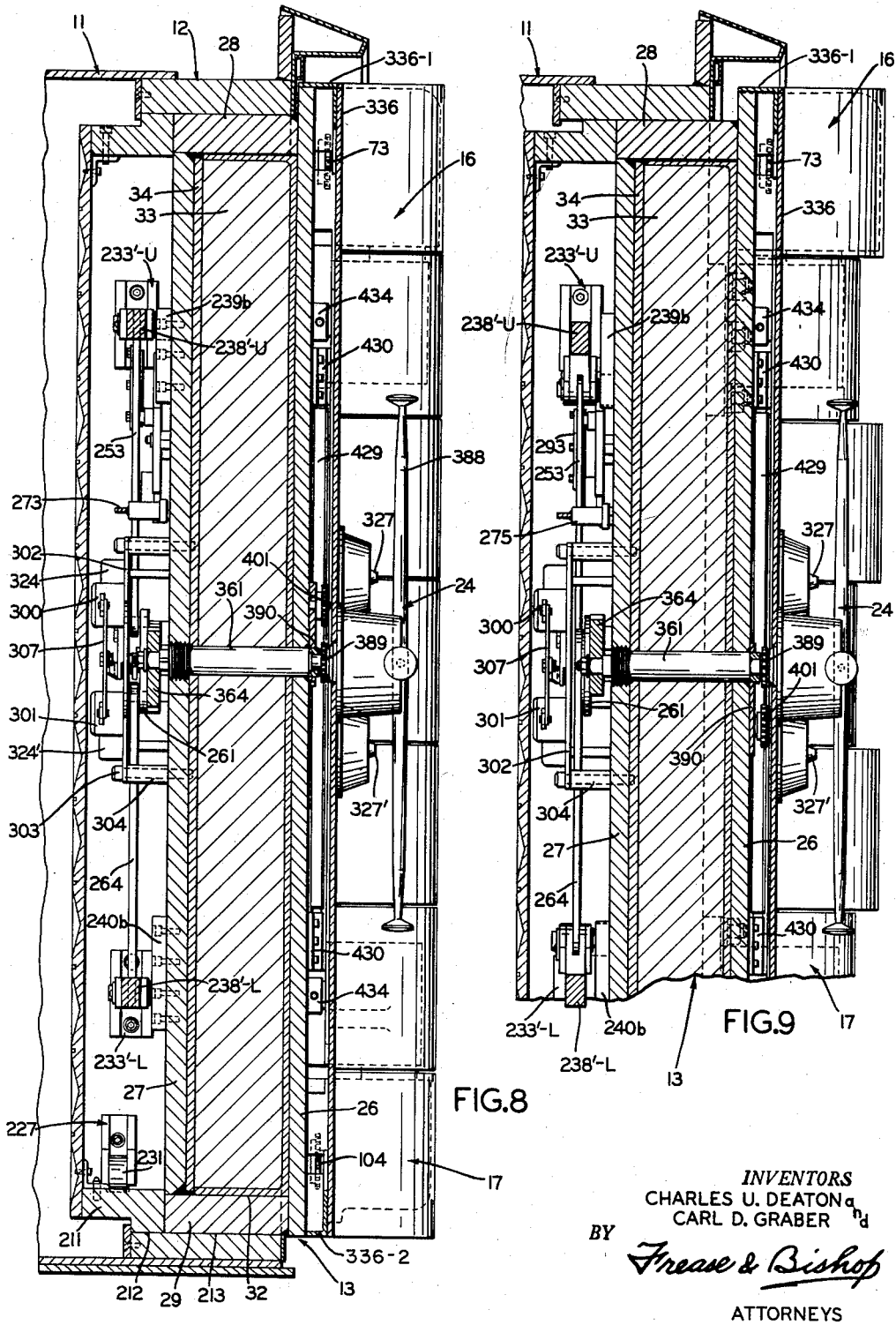

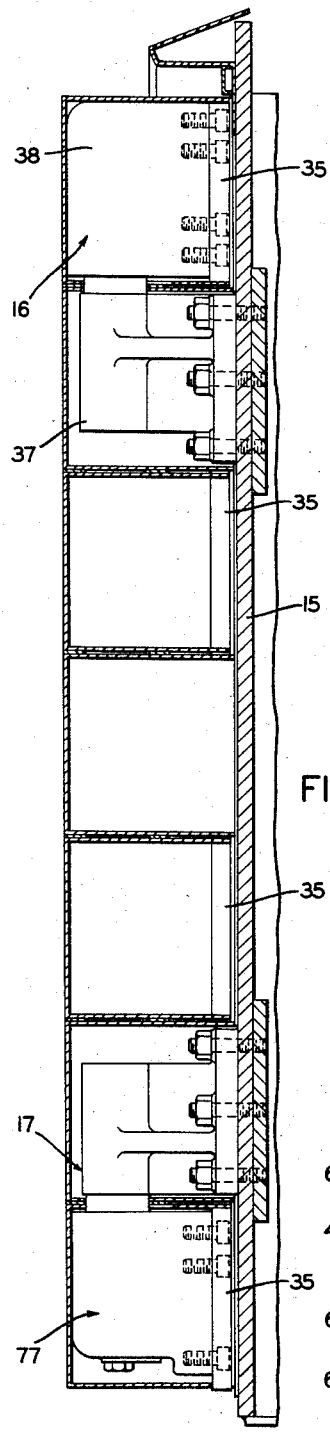
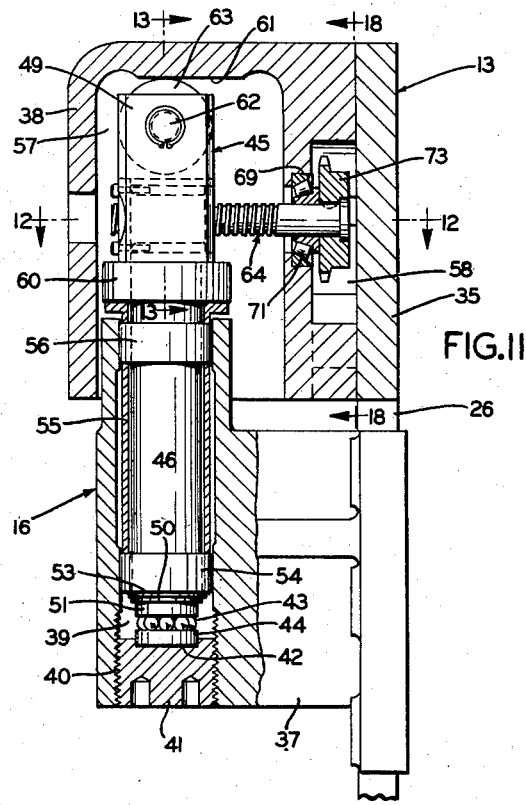
FIG.10
FIG.11
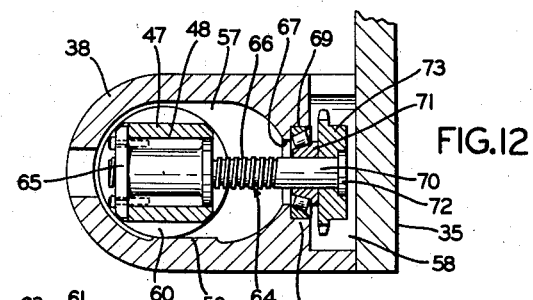
FIG.12
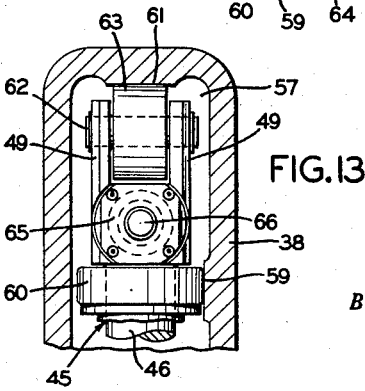
FIG.13
INVENTORS
CHARLES U. DEATON and
CARL D. GRABER
BY Frease & Bishop
ATTORNEYS Jan. 20, 1959

C. U. DEATON ET AL 2,869,485

VAULT DOOR CONSTRUCTION

Filed Aug. 3, 1954

INVENTORS
CHARLES U. DEATON and
CARL D. GRABER
BY
*Frease & Bishop*
ATTORNEYS

Jan. 20, 1959    C. U. DEATON ET AL    2,869,485
VAULT DOOR CONSTRUCTION
Filed Aug. 3, 1954                        20 Sheets-Sheet 7

INVENTORS
CHARLES U. DEATON and
CARL D. GRABER
BY
*Frease & Bishop*
ATTORNEYS

Jan. 20, 1959　　C. U. DEATON ET AL　　2,869,485
VAULT DOOR CONSTRUCTION

Filed Aug. 3, 1954　　20 Sheets-Sheet 8

INVENTORS
CHARLES U. DEATON and
CARL D. GRABER
BY *Frease & Bishop*
ATTORNEYS

Jan. 20, 1959   C. U. DEATON ET AL   2,869,485
VAULT DOOR CONSTRUCTION
Filed Aug. 3, 1954   20 Sheets-Sheet 9

*INVENTORS*
CHARLES U. DEATON and
CARL D. GRABER
BY
*Frease & Bishop*
ATTORNEYS

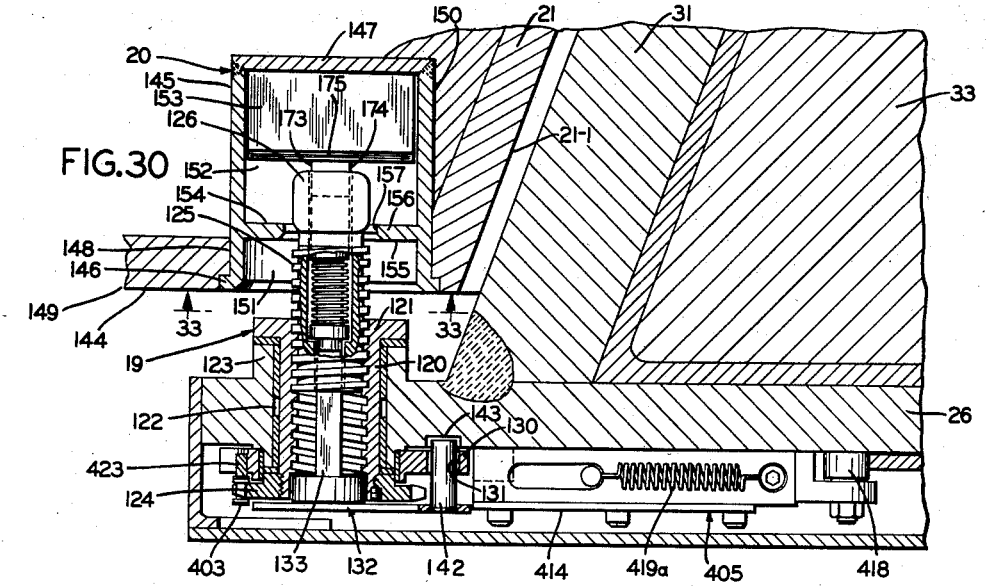
FIG.30
FIG.31
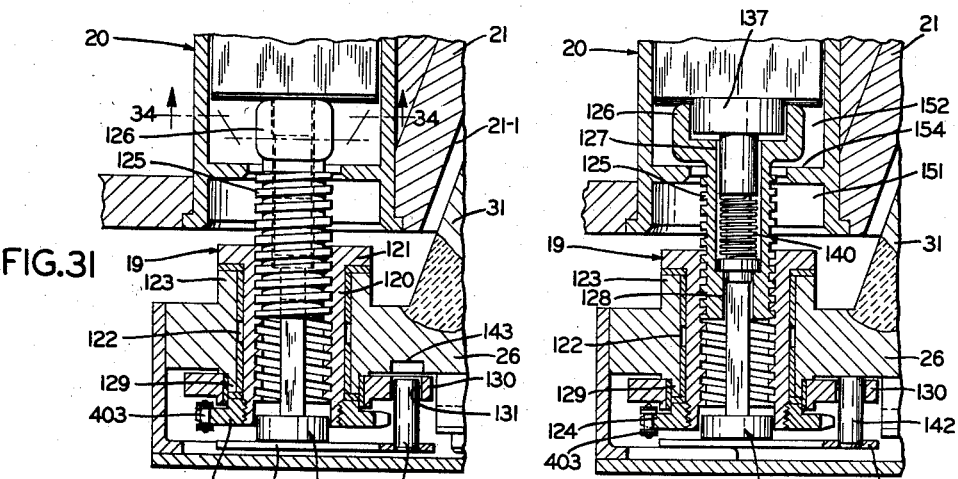
FIG.32
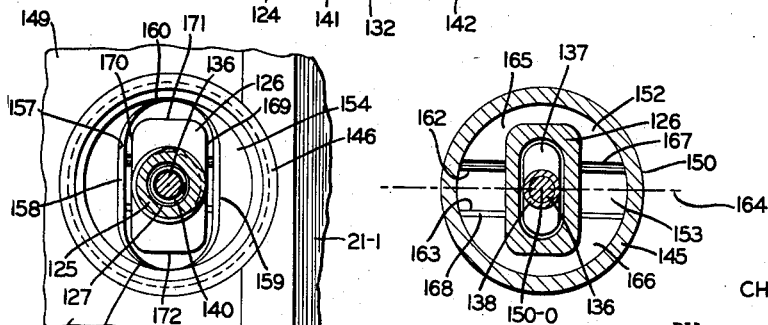
FIG.33
FIG.34
INVENTORS
CHARLES U. DEATON
CARL D. GRABER
BY Frease & Bishop
ATTORNEYS Jan. 20, 1959

C. U. DEATON ET AL 2,869,485

VAULT DOOR CONSTRUCTION

Filed Aug. 3, 1954

INVENTORS
CHARLES U. DEATON and
CARL D. GRABER
BY
Frease & Bishop
ATTORNEYS

Jan. 20, 1959  C. U. DEATON ET AL  2,869,485
VAULT DOOR CONSTRUCTION
Filed Aug. 3, 1954  20 Sheets-Sheet 12
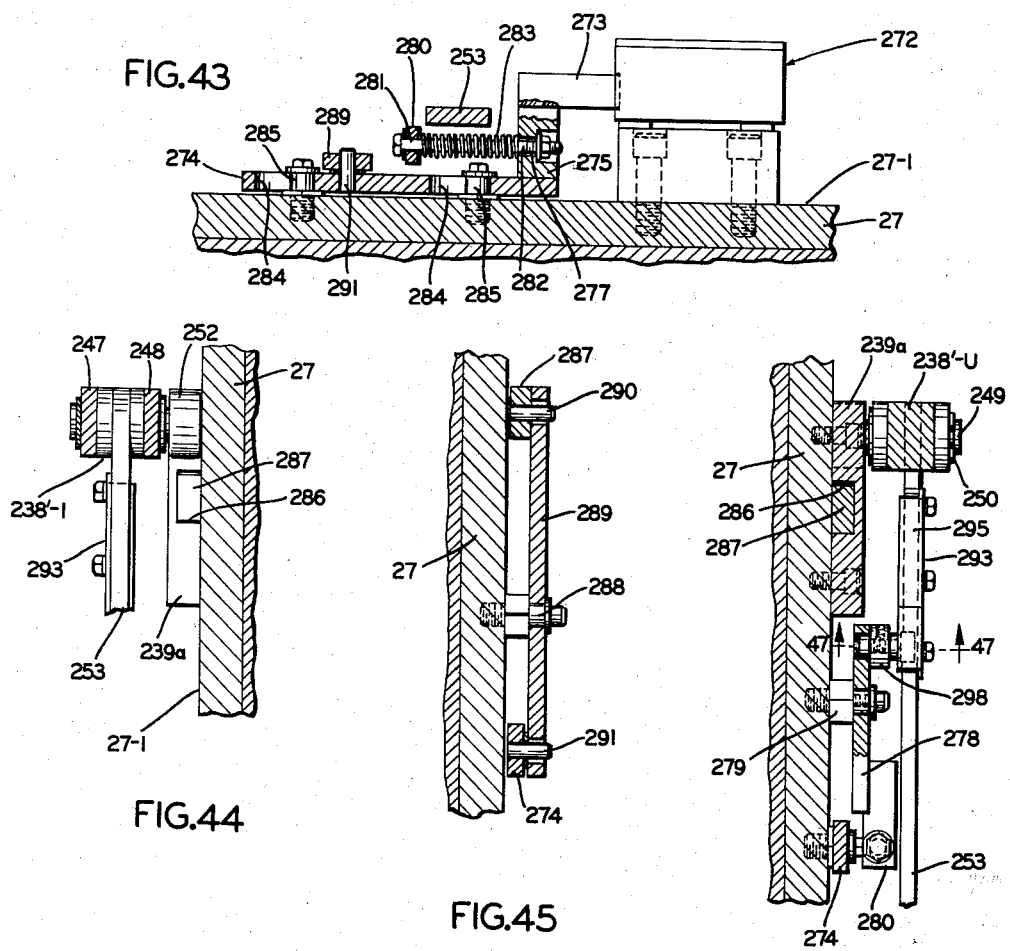
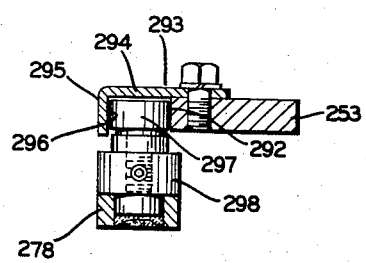
INVENTORS
CHARLES U. DEATON and
CARL D. GRABER
BY
Frease & Bishop
ATTORNEYS

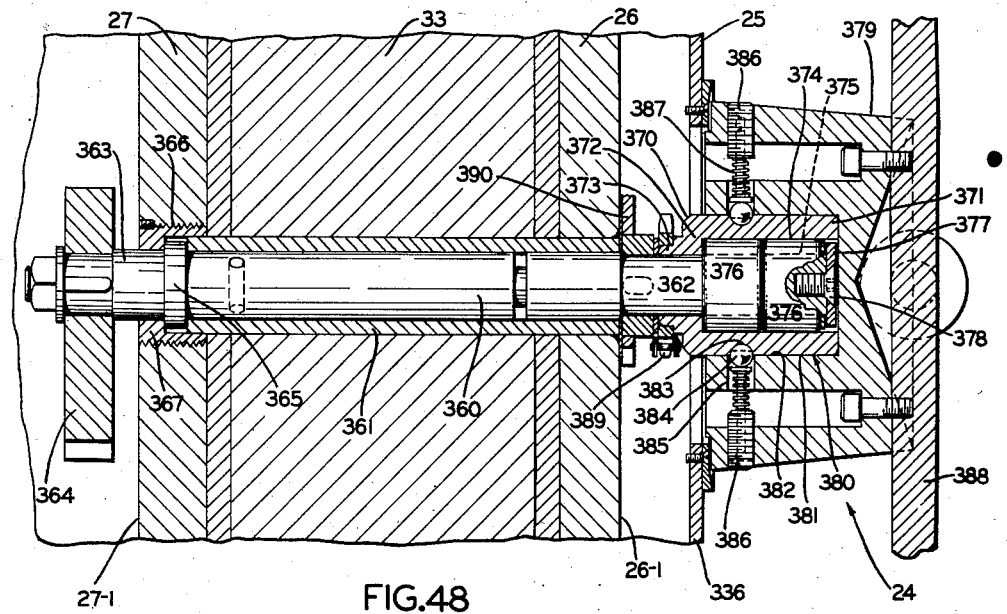
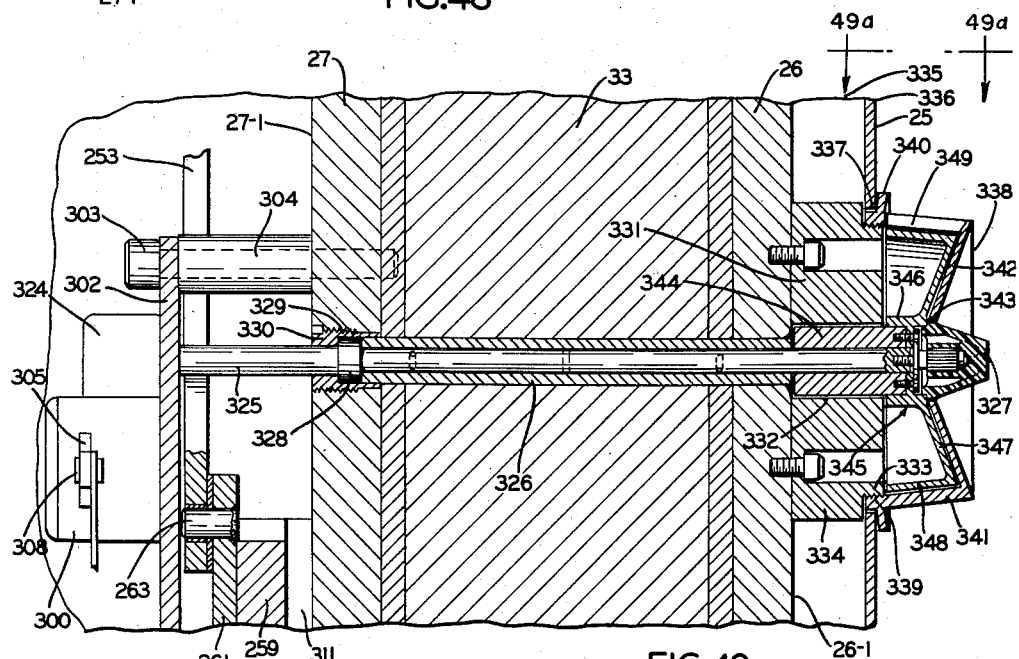
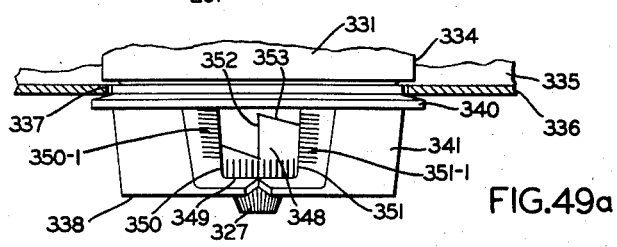

Jan. 20, 1959　　　C. U. DEATON ET AL　　　2,869,485
VAULT DOOR CONSTRUCTION
Filed Aug. 3, 1954　　　　　　　　　　　　　　　　20 Sheets-Sheet 14
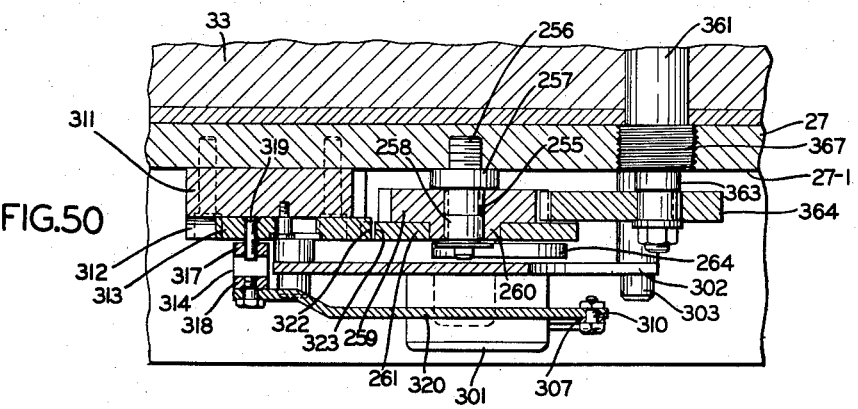
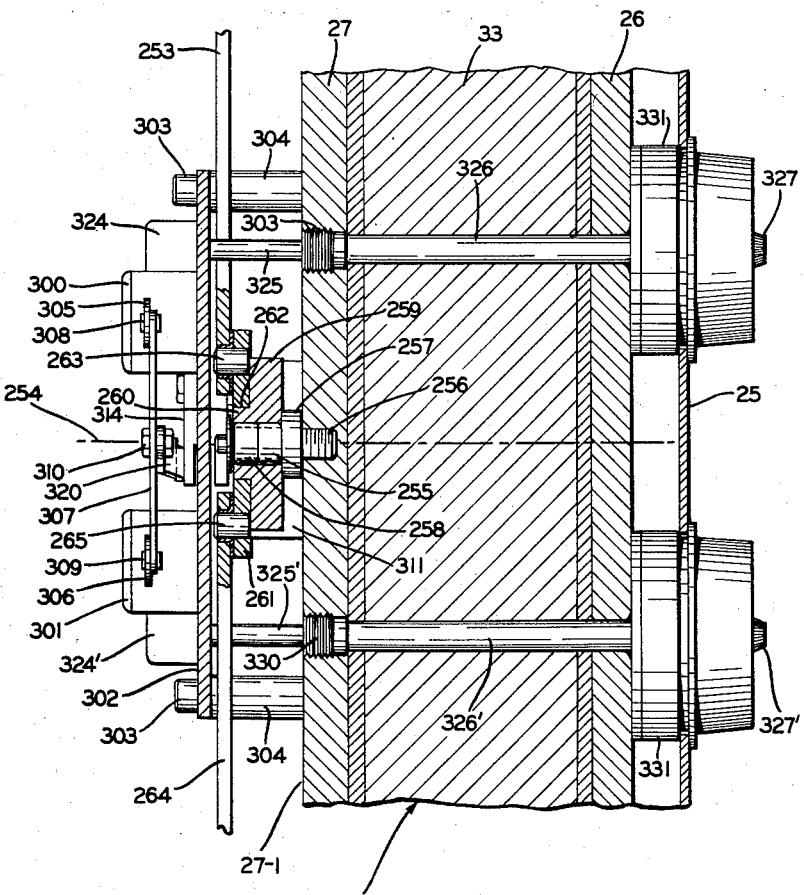
INVENTORS
CHARLES U. DEATON and
CARL D. GRABER
BY
*Frease & Bishop*
ATTORNEYS

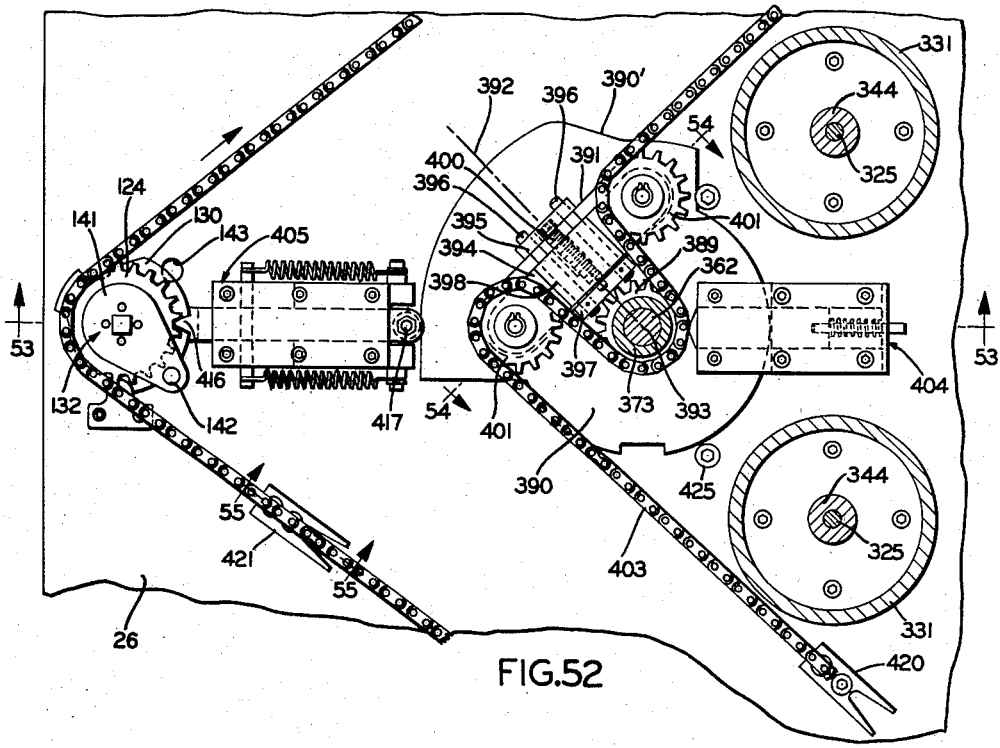

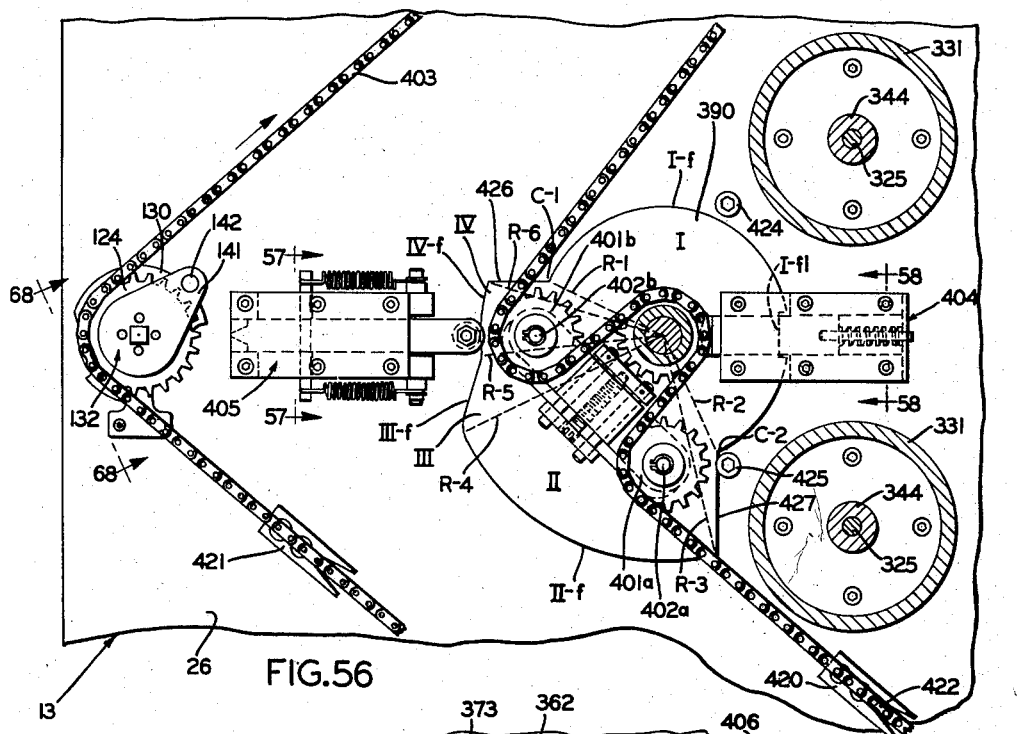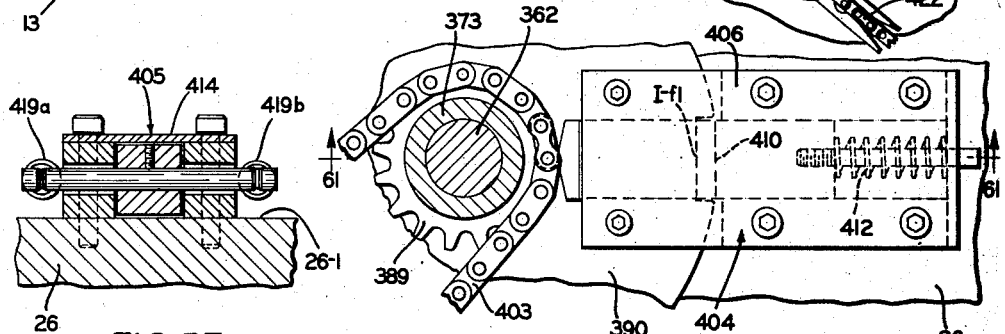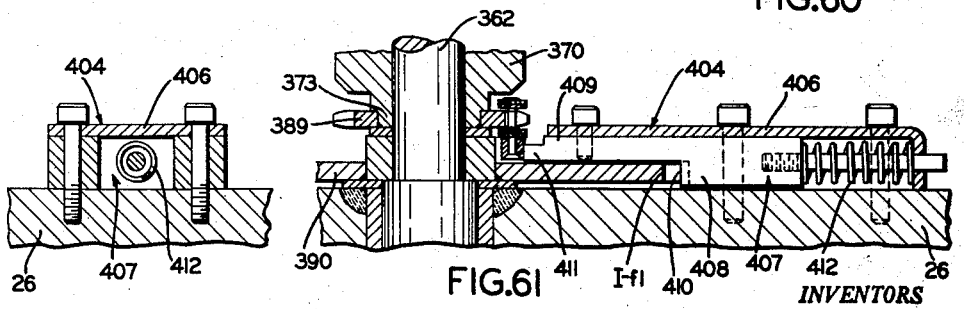

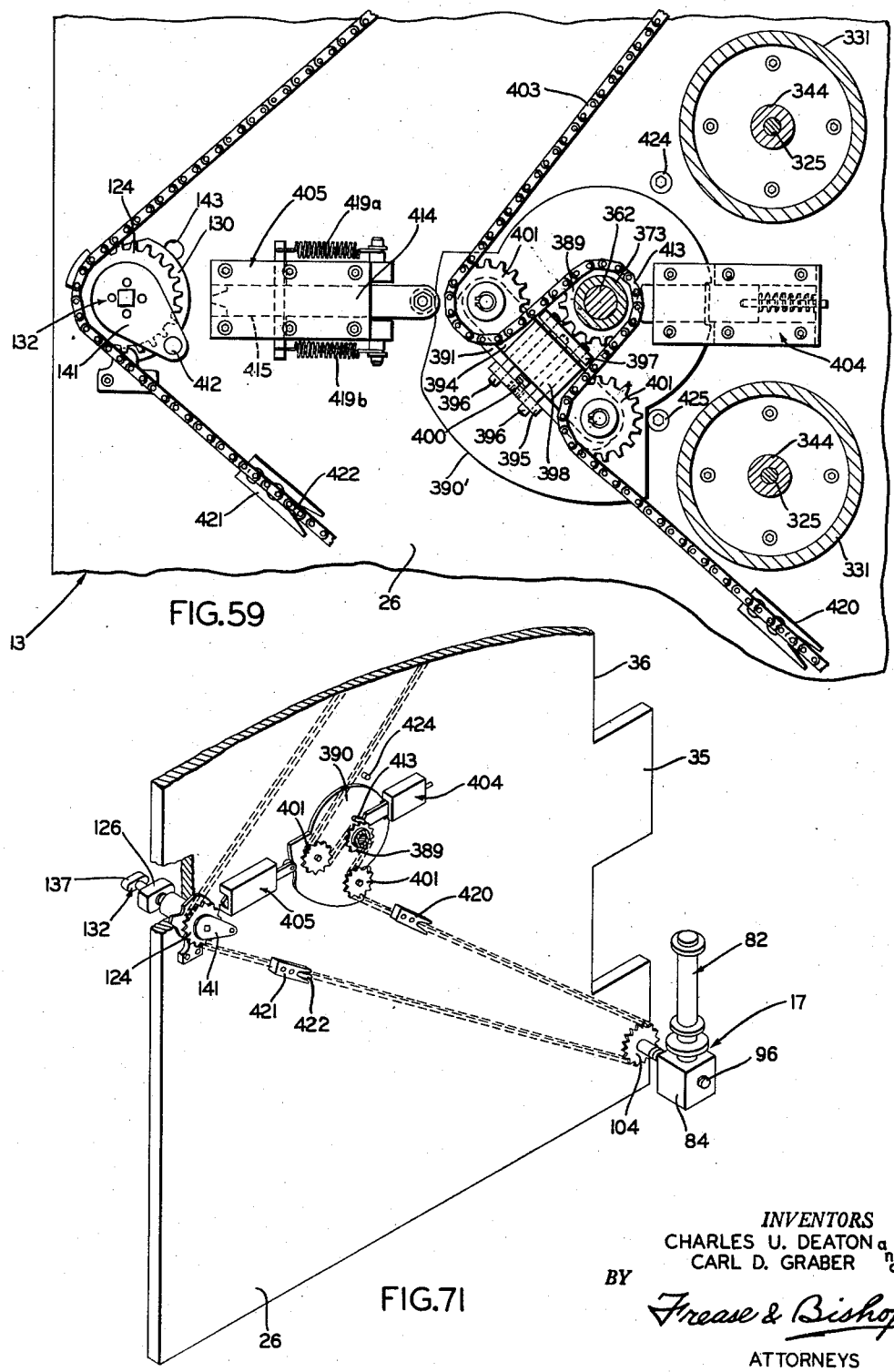

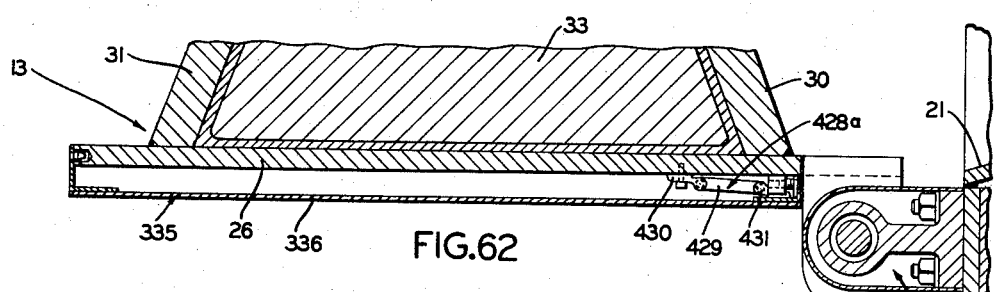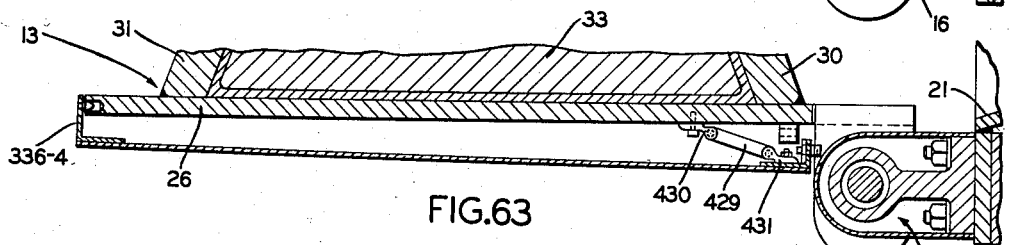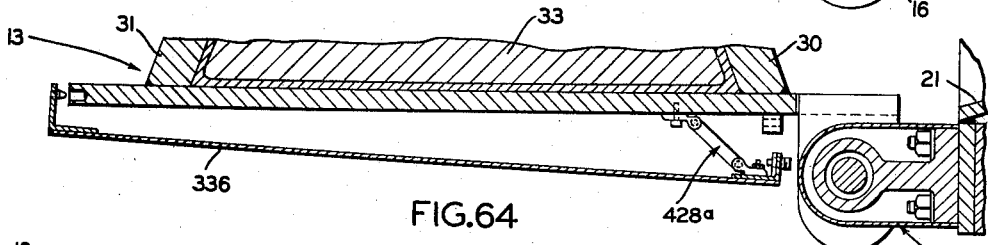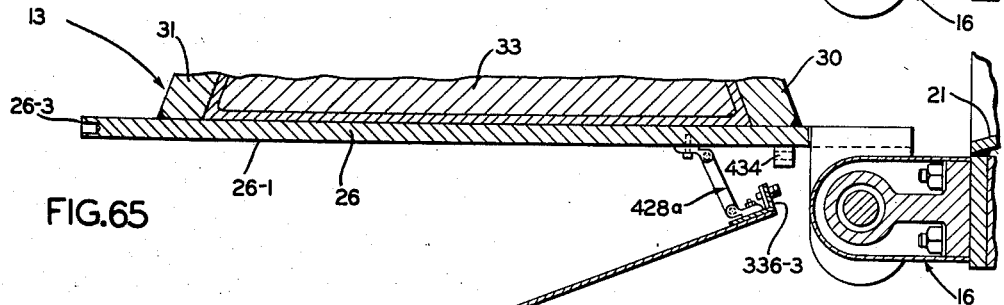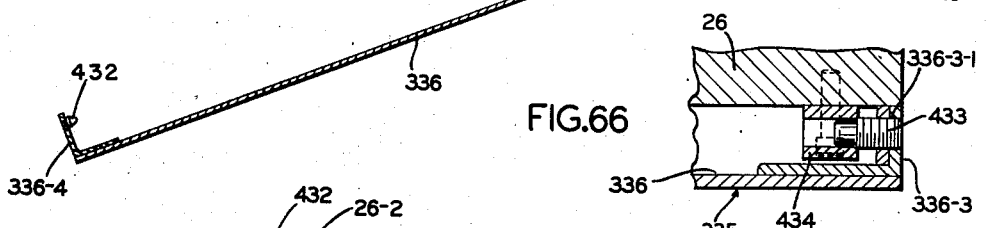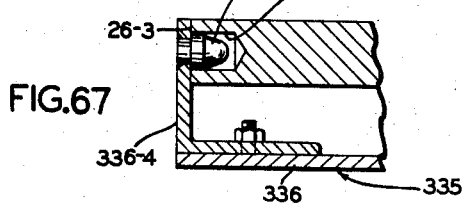

2,869,485

VAULT DOOR CONSTRUCTION

Charles U. Deaton, Kirkwood, Mo., and Carl D. Graber, Orrville, Ohio, assignors to Diebold, Incorporated, Canton, Ohio, a corporation of Ohio Application August 3, 1954, Serial No. 447,544

30 Claims. (Cl. 109—61)

The invention or discovery relates to vault door construction used as a constituent of a vault structure in a bank, government office, or other place of business or residence, and in which it is desired to store and safeguard valuables such as money, documents, and other articles.

In such a vault structure, access is had to the interior of the vault through a vestibule at the outer end of which is located a door frame, one of the major components of the vault door construction of the vault structure. The door frame includes structural elements or members engirdling an opening. The door of the vault door construction, constitutes a closure device for the opening, and in the closed position, is intended to plug the opening entirely.

The door of a vault door construction must be resistant to mechanical cutting tools, resistant to the intense heat of high-temperature torches, and resistant to explosives, the three attack implements used most frequently in burglary attempts. Moreover, a vault door construction must also be resistant to fire and earthquake hazards.

Thus, in order to meet these requirements, the door of a vault construction must be massive; and on the other hand when desired to be opened or closed by authorized persons, the door must be easily moved to and from the closed position. For this purpose, the doors of usual vault door construction, prior to the present invention or discovery, have each been hung from one side of the door frame by an unsightly crane assembly extending in front of the door and the jamb, the crane assembly having hinge connections at one side with the jamb, and at the approximate vertical center line of the outside face of the door.

In addition, when the door is in the closed position in the frame of a vault door construction, the door must be equipped with a pressure system co-acting with the frame to press the massive door in the frame tightly. In a usual vault door construction, the pressure system has included an array of unsightly actuating bars operatively mounted on the front of the door, and the pressure system usually has a further function of controlling the path of the door in swinging from the open to the closed position.

In addition, the door of a usual vault door construction has a bolt-work, including bolts operatively mounted on the rear of the door, and reciprocable between positions engaging the door jambs, and positions disengaging the door jambs. This bolt-work may only be operated in a usual vault door construction, when a time lock on the door has operated to a non-stopping position with respect to the bolt-work, and when the two combination locks have been operated each to a non-stopping position with respect to the bolt-work.

When the bolt-work of a vault door has been unstopped by the usual three locks, at the predetermined time, a lever handle on the front of the door is thrown or a hand wheel on the front of the door is turned to disengage the locking bolts from the door frame. A hand wheel on the front of the door which operates the pressure system is then turned to release the pressure system so that the door can be swung open. The operation of opening the door must be performed in a relatively short time so that access to the interior of the vault may be had immediately when the bank opens for business in the morning.

By the year 1950, a large part of the public had become design conscious, and in the case of safety-deposit vaults in particular, to which the renters have access during banking hours, the unsightly appearance of the usual vault door, when in either the open or closed position, had presented a serious problem to the manufacturers and users of bank vault doors.

To summarize, prior to present invention or discovery, usual vault door construction has included a massive crane assembly for hanging and swinging the door to and from closed position, and a pressure system including a complicated array of operating bars on the front of the door, and which has the dual function of guiding the path of the door in swinging from the open to the closed position and of tightly pressing the door in the frame in the closed position, and bolt work including a multiplicity of bolts and bars on the back of the door. All of these three components have been thus objectionable from a mechanical standpoint; and have been unusually objectionable from the design standpoint to those sensitive to design, who by 1950 as above indicated constitute a large part of the public.

The general objects of the present invention or discovery, are thus two-fold, namely: (1) to simplify the hanging means, the pressure system, and the bolt-work of vault door construction; and (2) to accomplish this mechanical simplification in a manner whereby the external appearance of the construction, from the standpoint of design, has eye appeal instead of the ugliness of prior constructions.

Before stating specific objects of the present invention or discovery, it is pointed out that the massive crane-assembly, the pressure system, and the bolt-work of a usual vault door construction, include massive parts most of which require many individual machining operations and hand finishing. The methods of mass production have not, prior to the present invention or discovery, generally been applied to the production of a usual vault door construction.

A first specific object of the present invention or discovery, therefore, is to provide a vault door construction having a substantial number of parts adapted to be produced by mass production methods, or which may be standard machine parts available on the open market.

A second specific object of the present invention or discovery is to provide an improved pressure system, in which is eliminated the function of guiding the path of the door in swinging from the open to the closed position.

From another standpoint, a vault door construction may be described as being constituted by structural, mechanical, and structural-mechanical combinations and sub-combinations, the separate structural and mechanical elements of which co-act with one or more of the other elements in three ways: Namely, (1) as elements of a structure or structural component, only; (2) as elements of a mechanism or mechanical means, only; and (3) as dual function elements in the complete construction, or in a portion thereof constituting in itself a unitary construction or assembly, and in either of which each dual function element serves as both a structural and mechanical element.

The greater the number of dual function elements in a construction constituted by structural, mechanical, and structural-mechanical combinations and sub-combinations, the greater the degree of simplification of such construction.

Usual vault door constructions prior to the present invention or discovery have been characterized by a limited number of dual function elements.

A third specific object of the present invention or discovery, therefore, is to provide a vault door construction in which the number of dual function elements is substantially increased as compared with the number of dual function elements in prior vault door constructions.

The foregoing and other objects are attained by the vault door construction, parts, combinations, and sub-combinations, which comprise the present invention or discovery, the nature of which is set forth in the following general statement, and preferred embodiments of which, together with their mode of use, are set forth by way of example in the following description, and which are particularly and distinctly pointed out and set forth in the appended claims forming part hereof.

The nature of the improved vault door construction of the present invention or discovery may be stated in general terms as including members forming a rectangular door frame having a rectangular opening, a door movable into and out of plug fitting location in the opening, the door frame including opposite vertical side members, and a top hinge mechanism and a bottom hinge mechanism operatively interposed between one side of the door and one of the frame side members.

The top hinge mechanism includes roller means supporting the entire load of the door and means resisting tilting of the door, and the bottom hinge mechanism includes means resisting tilting of the door. Each hinge mechanism includes a housing connected with the door and a housing connected with the supporting frame side member, and each hinge mechanism includes a hinge pin located in the frame connecting housing and extending into the door connected housing, and means are interposed between each hinge pin and its associate door connected housing for moving the door towards and away from the frame.

At the other side of the door there is operatively mounted one unit of a door and frame engaging mechanism including another unit located in the other frame side member. The door and frame engaging mechanism is operative for making an engagement between the door and the frame when the door is closed and for moving that portion of the door on which the one unit is mounted towards and away from the frame.

Bolt work for the door includes two longitudinally extending bolt bars operatively mounted on the rear of the door and extendable and retractable to and from engaging relationship with end faces of side members of the frame.

Common operating mechanism is mounted on the door and operatively associated with the hinge mechanisms, the door unit of the separable door and frame engaging mechanism, and the bolt work. The common operating mechanism is actuatable by a rotatable spoke handle unit projecting from the front face of the door.

By way of example, embodiments of the improved vault door construction and parts thereof, of the present invention or discovery are illustrated in the accompanying drawings forming part hereof, in which Fig. 1 is a front elevational view of a preferred embodiment of the improved vault door construction, showing the outside or front faces of the door and frame, the door being in the closed position.

Fig. 2 is a vertical transverse sectional view thereof, as on line 2—2, Fig. 1, looking in the direction of the arrows.

Fig. 3 is a fragmentary horizontal sectional view thereof, as on line 3—3, Fig. 1, looking in the direction of the arrows.

Fig. 4 is a view similar to Fig. 1, showing the door in open position, and the day gate in the closed position.

Fig. 5 is a vertical transverse sectional view thereof, as on line 5—5, Fig. 4, looking in the direction of the arrows.

Fig. 8 is an enlarged vertical transverse sectional view of the door and frame, as on line 8—8, Fig. 1, looking in the direction of the arrows.

Fig. 9 is a view similar to Fig. 8, showing the door in its position after its operating mechanism has been actuated to perform initial steps in the door opening cycle, whereby the door has been moved horizontally from its plug-sealing position in the opening of the door frame, to a position displaced forwardly from the door frame.

Fig. 10 is an enlarged vertical transverse sectional view as on line 10—10, Fig. 1, looking in the direction of the arrows, portions of the hinge covers and mock hinge covers being shown in section.

Fig. 11 is a fragmentary enlarged side elevational view of the top hinge mechanism corner of the construction, portions being shown in vertical section, as on line 11—11, Fig. 1, looking in the direction of the arrows.

Fig. 12 is a horizontal sectional view of the top hinge mechanism of the construction, as on line 12—12, Fig. 11, looking in the direction of the arrows.

Fig. 13 is a fragmentary vertical transverse sectional view of the top hinge mechanism of the construction, as on line 13—13, Fig. 11, looking in the direction of the arrows.

Fig. 30 is a fragmentary view similar to Fig. 25, showing the parts of the door and frame engaging mechanism in their relative positions when the door has been open and swung to the position ready for the plug-sealing operation, or when the door has been plug-sealed and is ready to be swung open.

Fig. 31 is a fragmentary view similar to Fig. 30, showing the parts of the door and frame engaging mechanism after the door has been pushed to release the control plunger.

Fig. 32 is a fragmentary view similar to Fig. 31, showing the parts of the door and frame engaging mechanism after its operation to engage the door and the frame, and before its operation to plug seal the door in the frame, as in Fig. 25.

Fig. 33 is a fragmentary transverse sectional view, as on line 33—33, Fig. 30, locking in the direction of the arrows.

Fig. 34 is a transverse sectional view, as on line 34—34, Fig. 31, looking in the direction of the arrows.

Fig. 43 is a fragmentary transverse sectional view of the door, as on line 43—43, Fig. 35, looking in the direction of the arrows.

Fig. 44 is a fragmentary vertical sectional view of the door, as on line 44—44, Fig. 35, looking in the direction of the arrows.

Fig. 45 is another fragmentary vertical sectional view of the door, as on line 45—45, Fig. 35, looking in the direction of the arrows.

Fig. 46 is another fragmentary vertical sectional view of the door, as on line 46—46, Fig. 35, looking in the direction of the arrows.

Fig. 47 is a transverse sectional view, as on line 47—47, Fig. 46, looking in the direction of the arrows.

Fig. 48 is an enlarged fragmentary horizontal sectional view of the construction, as on line 48—48, Fig. 1, illustrating details of the rotatable spoke handle unit and other parts of the common operating mechanism.

Fig. 49 is an enlarged fragmentary transverse sectional view as on line 49—49, Fig. 1, illustrating details of construction of one of the combination lock dials and other parts included in the common operating mechanism.

Fig. 50 is an enlarged fragmentary horizontal view as on line 50—50, Fig. 35, illustrating other details of construction of the common operating mechanism.

Fig. 51 is an enlarged fragmentary vertical sectional view, as on line 51—51, Fig. 35, illustrating additional details of construction of the common operating mechanism.

Fig. 52 is an enlarged view of portions of Fig. 22, illustrating details of construction of the common operating mechanism, parts being shown in their relative positions when the door is closed, the bolts are thrown in engagement with the door frame side members, and the locking parts are in locked position.

Fig. 53 is a transverse sectional view thereof, as on line 53—53, Fig. 52, looking in the direction of the arrows.

Fig. 54 is another fragmentary transverse sectional view thereof, as on line 54—54, Fig. 52, looking in the direction of the arrows.

Fig. 55 is another fragmentary transverse sectional view thereof, as on line 55—55, Fig. 52, looking in the direction of the arrows.

Fig. 56 is a view similar to Fig. 52, showing the parts in their relative positions, when the lock parts have been withdrawn from locking engagement, the bolt bars withdrawn, and other parts positioned for permitting opening of the door if closed, or positioning of the door if open for operation of the door and frame engaging mechanism.

Fig. 57 is a fragmentary vertical sectional view thereof, as on line 57—57, Fig. 56, looking in the direction of the arrows.

Fig. 58 is another fragmentary transverse sectional view thereof, as on line 58—58, Fig. 56, looking in the direction of the arrows.

Fig. 59 is a view similar to Figs. 52 and 56, showing the parts in their relative positions at an intermediate point between the positions shown in Fig. 52 and Fig. 56.

Fig. 60 is an enlarged view of portions of Fig. 59.

Fig. 61 is a horizontal transverse sectional view thereof, as on line 61—61, Fig. 60, looking in the direction of the arrows.

Fig. 62 is a fragmentary horizontal sectional view of the construction, as on line 62—62, Fig. 22, with the door in an intermediate position between the closed and the opened position, and showing details of construction of the movable link or crane hinge mounted front cover plate of the door, and all of the operating parts mounted on the door front plate, being omitted.

Fig. 63 is a view similar to Fig. 62 showing the relative positions of the door front cover plate, at an initial stage in the opening thereof, from the closed position shown in Fig. 62.

Fig. 64 is a view similar to Figs. 62 and 63 showing the parts at a secondary stage during the opening of the front cover plate.

Fig. 65 is another view similar to Figs. 62, 63, and 64, showing the parts in their relative positions when the front cover plate is open.

Fig. 66 is an enlarged fragmentary horizontal sectional view, as on line 66—66, Fig. 22, showing in greater detail portions of the front cover plate and associated parts.

Fig. 67 is another fragmentary enlarged horizontal sectional view, as on line 67—67, Fig. 22, showing other details of the front cover plate and associated parts.

Fig. 71 is a fragmentary view similar to Figs. 69 and 70, showing the relative positions of the illustrated parts, at an intermediate point between the positions shown in Fig. 69 and the positions shown in Fig. 70.

Fig. 49a is a fragmentary top plan view looking in the direction of the arrows 49a—49a, Fig. 49.

Similar numerals refer to similar parts throughout the several views of the drawings.

Figure 6:
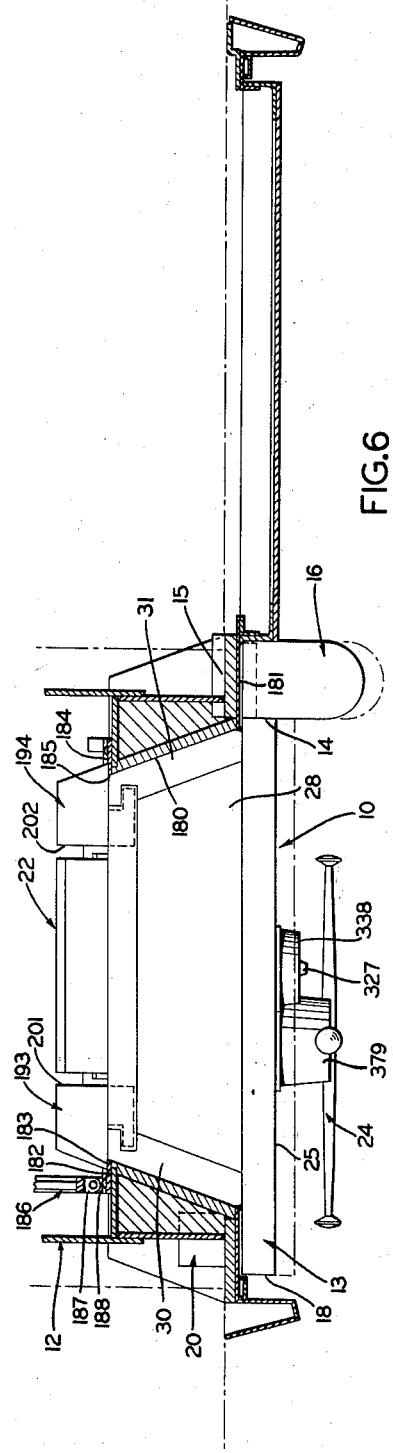
Fig. 6 is an enlarged horizonal sectional view of the door and frame, as on line 6—6, Fig. 1, looking in the direction of the arrows.

The following descriptive specification is contained in consecutive sections, which are entitled as follows:

I. General Construction.
II. Hinge Mechanisms.
III. Separable Door and Frame Engaging Mechanism.
IV. The Bolt Work.
V. Common Operating Mechanism.

I. GENERAL CONSTRUCTION

The improved vault door construction is indicated generally by 10, and includes members forming a rectangular door frame indicated generally by 11 which is located at the front end of a rectangular vestibule indicated generally by 12. An improved vault door indicated generally by 13 is supported at one side 14 on one of the composite side members 15 of the door frame by an improved top hinge mechanism indicated generally by 16, and by an improved bottom hinge mechanism indicated generally by 17.

At the other side 18 of the door 13 there is operatively mounted one unit indicated generally by 19 of a separable door and frame engaging mechanism. The other unit indicated generally by 20 of the separable door and frame engaging mechanism is located in the other composite frame side member 21.

The bolt work for the door is indicated generally by 22 and is operatively mounted on the rear of the door.

Figure 22:
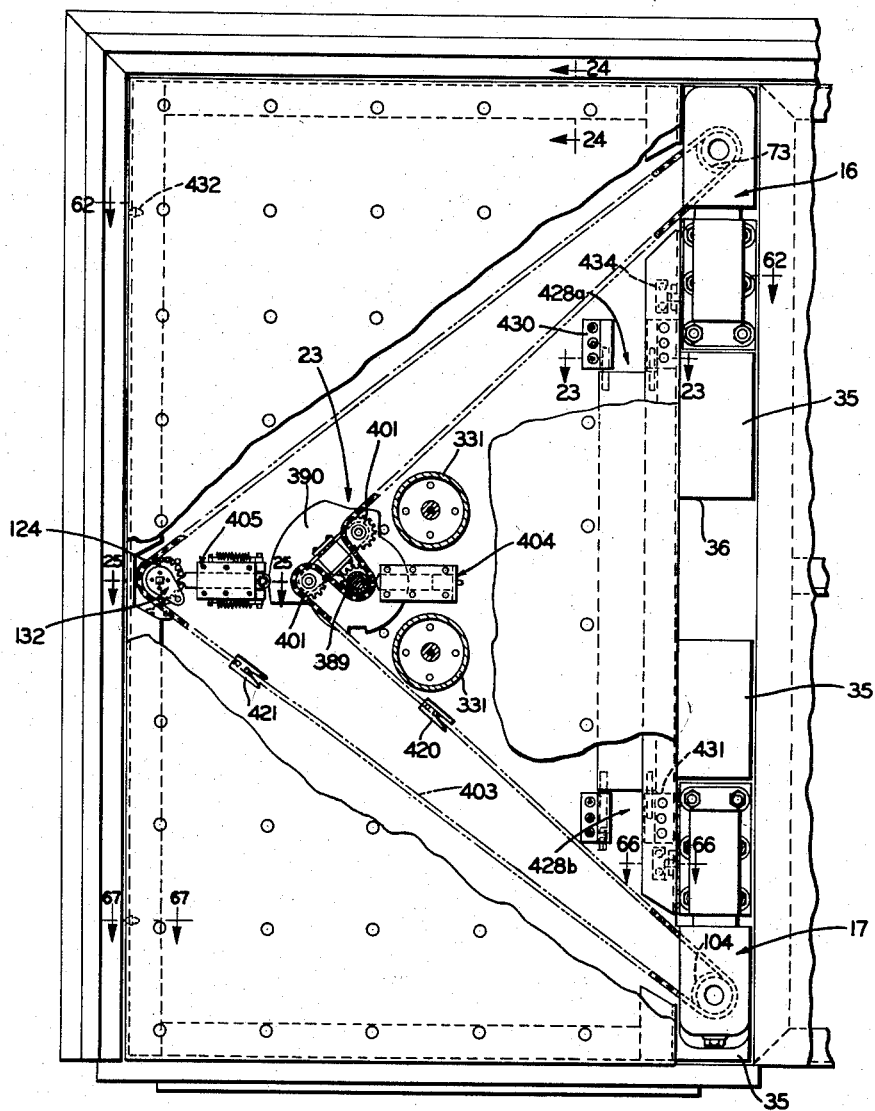
Fig. 22 is an enlarged fragmentary view of portions of the door and frame similar to Fig. 1, parts being removed, and portions being broken away, for illustrating details of construction.
Figure 24:
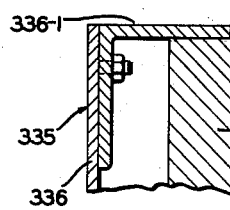
Fig. 24 is a fragmentary vertical sectional view thereof, as on line 24—24, Fig. 22, looking in the direction of the arrows.
Figure 23:
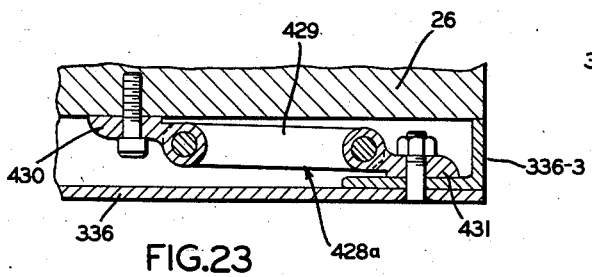
Fig. 23 is a fragmentary transverse sectional view thereof, as on line 23—23, Fig. 22, looking in the direction of the arrows.

Common operating mechanism indicated generally by 23, Fig. 22, is operatively associated with the hinge mechanisms 16 and 17, the unit 19 of the separable door and frame engaging mechanism, and the bolt work 22. The common operating mechanism 23 is actuatable by a rotatable spoke handle unit indicated generally by 24 projecting from the front face 25 of the door 13.

Referring particularly to Figs. 6, 7, 8, and 9, the door 13 is of composite construction and includes a rectangular case constituted by a front plate 26, a back plate 27, a top member 28, a bottom member 29, and side members 30 and 31. In the interior 32 of the door case formed by these plates and members, there is located in a usual manner relatively thick torch resistant block 33 in the forward portion of the case interior 32, and a drill resistant plate 34 between the block 33 and the back plate 27.

Figure 21:
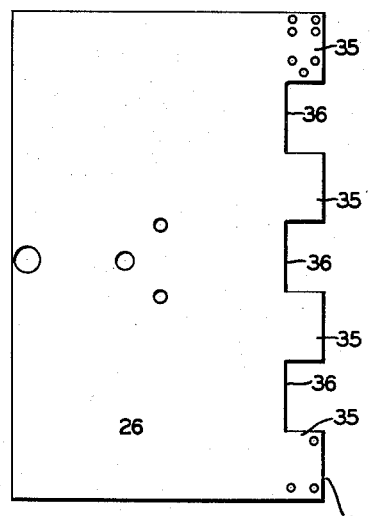
Fig. 21 is a detached elevational view of the front plate of the door.

As best shown in Fig. 21, the door case front plate 26 at the side 14 of the door is formed with alternating tongues 35 and notches 36, each tongue and each notch being rectangular and being sized to interfit with clearance in a registering notch or tongue formed in the frame side member 15.

The top tongue 35 of the door frame plate 26 mounts parts of the top hinge mechanism 16, as best shown in Figs. 10 and 11. Other parts of the top hinge mechanism 16 are supported on the immediately adjacent tongue of the door frame side member 15.

II. HINGE MECHANISMS

Referring to Figs. 11, 12, 13, 18, and 19, the top hinge mechanism 16 includes a lower housing and bearing block 37 mounted on the door frame side member 15, and an upper housing and bearing block 38 mounted on the top tongue 35 of the door front plate 26.

The lower housing and bearing block 37 has formed therein adjacent its front end a vertical bore 39 the lower end of which is provided with internal threads 40 in which is screwed an adjustable thrust bearing mounting plug 41, in the upper end of which there is formed a bearing seat socket 42. A ball thrust bearing 43 has its lower raceway 44 seated in the socket 42.

Figures 19, 20:
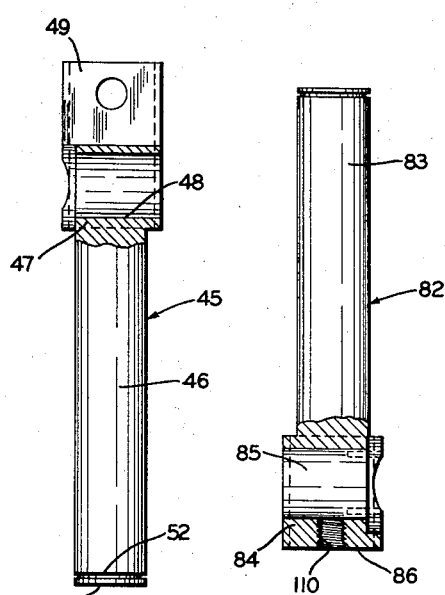
Fig. 19 is a detached view of the pin for the top hinge mechanism of the construction, portions being shown in vertical section.
Fig. 20 is a detached view of the pin for the bottom hinge mechanism of the construction, portions being shown in section.
Figure 16:
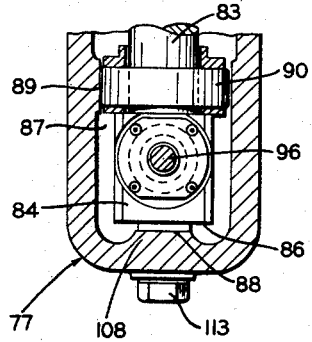
Fig. 16 is a fragmentary vertical transverse sectional view of the bottom hinge mechanism of the construction, as on line 16—16, Fig. 14, looking in the direction of the arrows.

The hinge pin 45 for the top hinge mechanism 16 is shown detached in Fig. 19, and includes a lower cylindrical shank 46, which makes junction at its upper end with an intermediate nut mounting portion 47 having a bore 48 formed therein, the axis of which intersects and is perpendicular to the longitudinal axis of the shank 46. Above the nut mounting portion 47 of the pin 45, there extends upwardly a pair of laterally spaced roll shaft supporting lugs 49. The shank 46 of the hinge pin 45 has a lower transverse thrust face 50.

In the assembled hinge mechanism 16, as best shown in Fig. 11, the shank 46 extends into the bore 39 of the block 37, and the thrust face 50 of the shank 46 seats upon the upper raceway 51 of the ball thrust bearing 43. Adjacent the thrust face 50 of the shank 46 there is formed in the cylindrical outer face of the shank 46 a retainer ring groove 52, which in the assembled hinge mechanism 16 seats a retainer ring 53. A lower radial needle bearing 54 fits on the shank 46 and seats on the retainer ring 53, the outer surface of the needle bearing 54 fitting in a central portion of the bore 39. A spacer sleeve 55 fits on the shank 46 and seats on the upper end of the needle bearing 54. An upper radial needle bearing 56 fits on the shank 46 and seats on the upper end of the sleeve 55, the outer surface of the needle bearing 56 fitting in an upper portion of the bore 39.

The upper housing and bearing block 38 has formed therein a downwardly opening socket 57, and the upper end of the shank 46 of the hinge pin 45, the nut mounting portion 47 thereof, and the lugs 49 are located in the socket 57. At the rear of the block 38 there is formed a rearwardly opening socket 58.

At one side of the inner surface of the socket 57 there is formed a flat bearing pad surface 59. On the shank 46 above the upper end of the lower housing and bearing block 37, there is mounted a radial ball or roller bearing 60 the cylindrical outer surface of the outer raceway of which rolls against the flat pad surface 59. The socket 57 has a downwardly facing horizontal flat bearing pad end surface 61. Between the lugs 49 at the upper end of the hinge pin 45 there is operatively mounted on an axially horizontal shaft 62 supported by the lugs 49, a load bearing roller 63 upon an upper horizontal surface portion of which the downwardly facing horizontal flat bearing pad end surface 61 is supported.

By the construction of the top hinge mechanism 16 as thus far described, the entire vertical load of the door 13 is carried from the upper housing and bearing block 38 to the roller 63 and through the pin 45 to the thrust bearing 43, and from the thrust bearing 43 to the lower housing and bearing block 37 and thence to the frame side member 15. The radial ball or roller bearing 60 rolling against the side flat pad surface 59 prevents tilting of the door 13.

Moreover, in the improved top hinge mechanism 16, the upper housing and bearing block 38 and the door 13 carried thereby are arranged to move in a straight line which is horizontal in the construction 10, and means are provided for moving the block 38 and upper end of the door 13 back and forth on the roller 63.

As shown the means for moving the block 38 back and forth on the roller 63, constitute a ball bearing nut and screw jack assembly indicated generally by 64, and which includes a ball bearing nut housing 65 which fits in and is secured in the bore 48 of the nut mounting portion 47 of the hinge pin 45. A screw 66 is screwed in the nut housing 65 and extends rearwardly towards the door top tongue 35 through an opening 67 formed in the wall 68 of the block 38 between the socket 58 and the socket 57. The opening 67 is formed with a bearing seat 69, and the screw 66 has a cylindrical shank 70 located in the opening 67, and a tapered roller thrust bearing 71 is fitted on the shank 70 and seated in the seat 69. The outer end of the shank 70 is formed with a thrust head 72, and a sprocket 73 is secured on the shank 70 between the head 72 and the inner raceway of the bearing 71. Rotation of the sprocket 73 and screw 66, by whatever means serves to advance or retract the block 38 and supported door 13 towards and away from the hinge pin 45.

The ball bearing nut and screw jack assembly 64, as above described may be otherwise termed a push-pull rectilinear thrust mechanism connected between the hinge 45 and the door 13.

The top hinge mechanism 16 thus constitutes in itself a novel hinge mechanism, which may be used when desired in other constructions than in the illustrated improved vault door 10.

Figure 18:
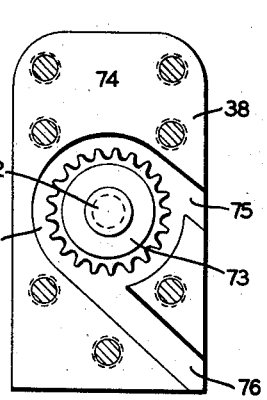
Fig. 18 is a vertical sectional view of the top hinge mechanism of the construction as on line 18—18, Fig. 11.

As shown in Fig. 18 the housing 38 has a back face 74 in which the socket 58 is located, and there is also formed in the back face 74 of the housing 38 sloping chain channel grooves 75 and 76 for purposes hereinafter set forth in greater detail.

The bottom hinge mechanism 17 is best shown in detail in Figs. 14, 15, 16, 17, and 20, and includes a lower housing and bearing block indicated generally by 77, and which is secured to the lowermost tongue 35 of the door front plate 26.

The bottom hinge mechanism 17 furthermore includes an upper housing and bearing block 78 which is secured to the tongue of the frame side member 15 next above the lowermost door tongue 35.

The upper housing and bearing block 78 has formed therein a vertical bore 79, the upper end of which is formed with internal threads 80, and a screw plug 81 is screwed in the upper end of the bore 79.

The hinge pin 82 of the bottom hinge mechanism 17 is shown detached in Fig. 20, and includes an upper cylindrical shank 83 and a lower nut mounting head 84 having a transverse bore 85 formed therein, and the bottom face 86 of the head 84 is flat.

The lower housing and bearing block 77 has formed therein an upwardly opening socket 87 which has a lower flat bearing pad end surface 88 and a flat bearing pad side surface 89. The hinge pin 82 is located in the socket 87, the bottom face 86 of the hinge pin is slidably seated on the bearing pad end surface 88.

Immediately above the hinge pin head 84 there is seated on the shank 83, a radial ball bearing 90 having an outer raceway with an outer cylindrical surface which rolls against the bearing pad side surface 89. The shank 83 extends upwardly from the socket 87 in the lower block 77 into the bore 79 of the upper block 78. Immediately above the ball bearing 90, there is fitted on the shank 83, a needle bearing 91 the outer cylindrical surface of which is fitted in a lower portion of the bore 79. Above the needle bearing 91 a spacer sleeve 92 is fitted on the shank 83; and above the spacer sleeve 92, a needle bearing 93 is fitted on the upper end of the shank 83, and seated on the upper end of the sleeve 92. The outer cylindrical surface of the upper needle bearing 93 is fitted in an upper portion of the bore 79.

By the construction of the bottom hinge mechanism 17 as thus far described, tilting of the door 13 is prevented by the bearing pad side surface 89 thrusting against the radial ball bearing 90.

Moreover, in the improved bottom hinge mechanism 17, the lower housing and bearing block 77 and the lower corner of the door 13 to which the housing 77 is connected are arranged to move in a straight line which is horizontal in the construction 10, and means are provided for moving the block 77 and lower corner of the door 13 back and forth.

As shown, the means for moving the block 77 back and forth constitute a ball bearing nut and screw jack assembly indicated generally by 94, and which includes a ball bearing nut housing 95 which seats in and is secured in the bore 85 of the nut mounting head 84 of the hinge pin 82. A screw 96 is screwed in the nut housing 95 and extends rearwardly towards the door bottom tongue 35. The lower housing and bearing block 77 has formed therein a rearwardly opening socket 97, there being a wall 98 between the socket 97 and the socket 87, and the wall 98 has formed therein an opening 99 communicating between the socket 87 and the socket 97. The opening 99 is internally threaded, and an externally threaded thrust bearing seat ring 100 is screwed therein, and a roller thrust bearing 101 is seated in the ring 100.

The screw 96 has a cylindrical inner end shank 102 which is fitted in the inner raceway of the roller bearing 101, and there is a thrust flange 103 formed on the shank 102 adjacent the inner ends of the threads of the screw 96, the thrust flange 103 abutting against the outer end of the inner raceway of the roller bearing 101.

The shank 102 extends into the socket 97 where a sprocket 104 is located and secured on the shank 102.

Figure 17:
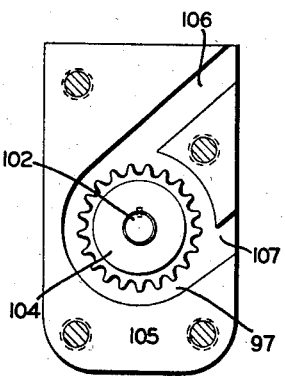
Fig. 17 is a fragmentary vertical sectional view of the bottom hinge mechanism of the construction as on line 17—17, Fig. 14.
Figure 15:
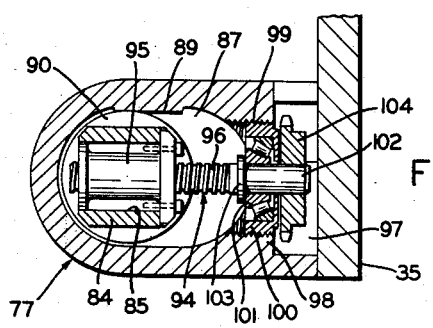
Fig. 15 is a horizontal sectional view of the bottom hinge mechanism of the construction, as on line 15—15, Fig. 14, looking in the direction of the arrows.

The lower housing and bearing block 77 has a rear face 105 through which the socket 97 opens, as best shown in Fig. 17. There are also formed in the rear face 105 of the block 77, upper and lower chain channel grooves 106 and 107 for purposes hereinafter set forth in greater detail.

Figure 14:
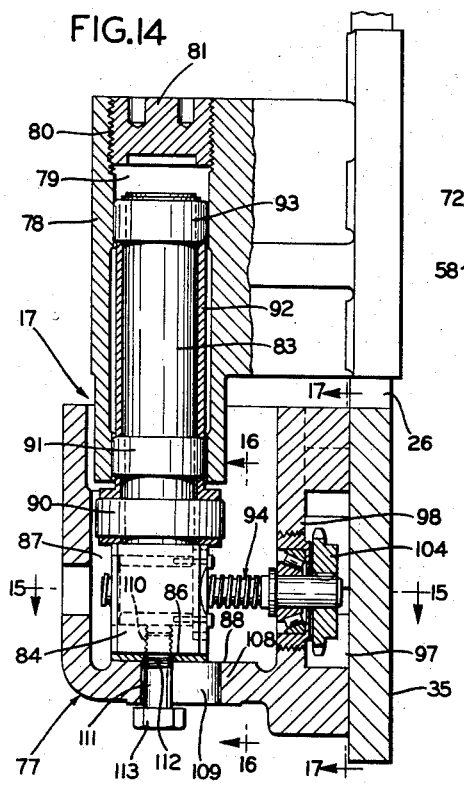
Fig. 14 is a fragmentary enlarged side elevational view of the bottom hinge mechanism corner of the construction, portions being shown in vertical section, as on line 14—14, Fig. 1, looking in the direction of the arrows.

Referring to Fig. 14, the bearing pad end surface 88 is an upper surface of the bottom end wall 108 of the housing and bearing block 77 of the bottom hinge mechanism 17. The end wall 108 has formed therein a central forwardly and rearwardly extending slot 109, and the nut mounting head 84 of the hinge pin 82 has formed therein a lower vertical internally threaded bore 110, and a washer is located between the bottom face 86 and the surface 88. A cap screw 111 has a threaded shank 112 extending through the slot 109 and the washer and screwed into the bore 110, and has a head 113 spaced a slight distance from the under face of the bottom end wall 108.

This construction of the slotted end wall 108, the cap screw 111, and the hinge pin 82, constitutes holddown means interposed between the hinge pin 82 and the housing and bearing block 78.

III. SEPARABLE DOOR AND FRAME ENGAGING MECHANISM

As stated above, the improved separable door and frame engaging mechanism of the improved vault door construction includes a unit 19 on the door 13 and a unit 20 in the frame side member 21. These units 19 and 20 are shown in Fig. 4 in the complete construction.

The details of the separable door and frame engaging mechanism are shown in Figs. 25 to 29, inclusive, and Figs. 30 to 34, inclusive.

The unit 19 on the door 13 includes a sleeve nut 120 which is exteriorly cylindrical and has an annular flange 121 at its inner end. The door front plate 26 extends laterally beyond the outer sloping side face of the door side member 31, which to a person facing the door 13 when it is closed, is at the left-hand side of the person, and for convenience the door side member 31 is termed the left-hand side member. The portion of the door front plate 26 extending laterally beyond the left-hand side member 31, may be termed the left-hand over-hang, and in which there is formed a bearing bore 122 in which the sleeve nut 120 is journalled.

On the rear face of the left-hand over-hang of the door front plate 26, there is located a boss 123 through which the bore 122 opens, and the flange 121 seats against the exterior end face of the boss 123. Preferably, there is interposed a bearing sleeve between the sleeve nut 120 and the bore 122, and preferably there is interposed an annular thrust disk between the flange 121 and the boss 123. The bore 122 opens at its front end through the front face of the door front plate 26, and the front end of the cylindrical sleeve nut 120 extends beyond the front face of the plate 26 and has secured thereon a sprocket 124.

The sleeve nut 120 is formed with internal threads, and an externally threaded tubular bolt 125 is screwed in the nut 120. A cupped T-head 126 is formed on the back end of the bolt 125 at the rear of the sleeve nut flange 121. The bore of the tubular bolt 125 includes a cylindrical portion 127 at its back end and a transversely square portion 128 at its front end.

Figure 26:
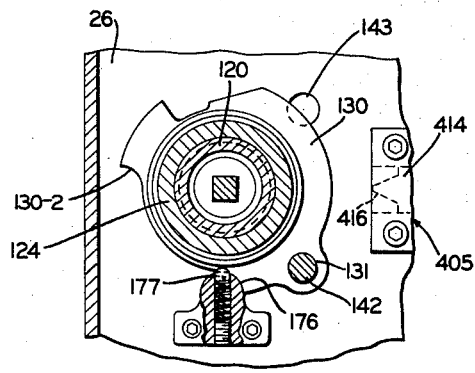
Fig. 26 is a fragmentary vertical sectional view thereof, as on line 26—26, Fig. 25, looking in the direction of the arrows.
Figures 27, 28:
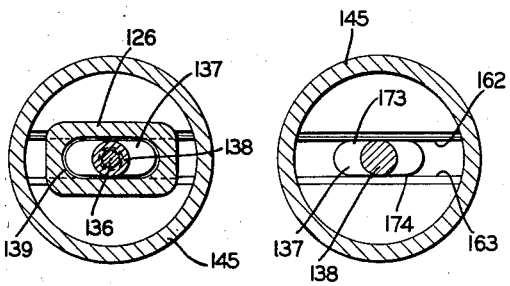
Fig. 27 is another vertical sectional view thereof, as on line 27—27, Fig. 25, looking in the direction of the arrows.
Fig. 28 is another vertical sectional view thereof, as on line 28—28, Fig. 25, looking in the direction of the arrows.

The front face of the door front plate 26 has located thereon an externally cylindrical boss 129 through which the bore 122 opens concentrically. An operating and stop disk 130 is journalled on the boss 129, as best shown in Fig. 26. The disk 130 has formed therein a guide bore 131 at the right side of its axis, with reference to a person facing the door 13 when closed. The disk 130 is located between the front face of the door front plate 26 and the sprocket 124.

Figure 29:
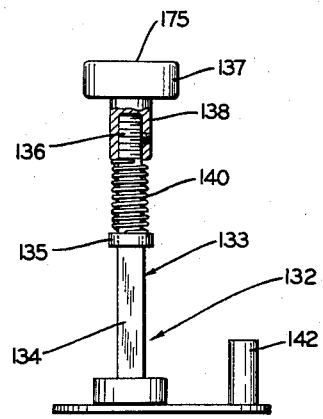
Fig. 29 is a detached view of the trigger or control plunger assembly of the door and frame engaging mechanism.

A trigger or control plunger assembly indicated generally by 132 and shown detached in Fig. 29, is operatively associated with the tubular bolt 125, the operating and stop disk 130, and the door front plate 26. The trigger or control plunger assembly 132 includes a shaft indicated generally by 133, and including a front square portion 134, having a back shoulder and an intermediate enlarged cylindrical washer 135, slidable on a back externally threaded cylindrical portion 136. In the assembled door 13 the shaft 133 is located in the bore of the tubular bolt 125, the shaft square portion 134 slidably fitting in the bore square portion 128, and the shaft washer 135 slidably fitting in the bore cylindrical portion 127.

The trigger or plunger assembly 132 furthermore includes a T-head 137 having an internally threaded tubular shank 138 which is screwed on the end of the threaded shaft portion 136.

The T-head 126 of the tubular bolt 125 has formed therein a rearwardly opening rectangular cup 139, and the T-head 137 of the assembly 132 slidably fits in the cup 139 of the T-head 126 in the assembled door 13.

A spring helix 140 engirdles the threaded portion 136 of the shaft 133 between the washer 135 and the outer end face of the shank 138, and the spring helix 140 reacts between the washer 135 and the T-head shank 138.

On the outer end of the square shaft portion 134, beyond the sprocket 124 in the assembled door 13, there is secured an actuating lever 141 from the rear face of which there extends a plunger 142 which fits in the guide bore 131 of the operating and stop disk 130.

Above and to the right of the axis of the shaft 133, with reference to a person facing the door 13 when closed, in the front face of the door front plate 26, there is formed a forwardly opening socket 143, in which the rear end of the plunger 142 may be slidably received, as best shown in Fig. 30.

In Fig. 30, the parts of the door and frame engaging mechanism are shown in their relative positions when the door has been open and has then been swung to the position for plug-sealing operation, or when the door has been moved outwardly from its plug-sealing position and is ready to be swung open. When the parts of the unit 19 are in the position shown in Fig. 30, the plunger 142 is engaged in the socket 130 preventing any rotary movement of the parts in the unit 19.

The composite frame side member 21 at the left-hand side of the frame with reference to a person facing the door when the door is closed, includes a seal member 21—1 which slopes from front to rear laterally from the larger front end opening of the frame to the smaller rear end opening thereof. The front end of the frame side seal member 21—1 makes junction with a vertical front frame finish plate 144 which is overlapped by the left-hand over-hang of the door front plate 26 when the door is in the position shown in Fig. 30.

The unit 20 of the door and frame engaging mechanism is mounted in the frame finish plate 144 at a level for interaction with the unit 19.

Referring particularly to Figs. 4, 25, 27, 28, and 30 to 34 inclusive, the unit 20 of the door and frame engaging mechanism constitutes a compartmented housing including an externally cylindrical body 145 at the front end of which there is located an outwardly extending annular flange 146 and at the back end of which there is located a circular back wall 147. The front end of the cylindrical body 145 and the annular flange 146 seat in and are secured in a counter-bored opening 148 formed in the front frame finish plate 144 whose front face 149 is vertical and perpendicular to the horizontal axis of the cylindrical exterior surface 150 of the body 145.

The compartments of the body 145 include a forwardly opening front compartment 151, an intermediate compartment 152, and a back compartment 153. A front partition wall 154 has parallel front and back faces 155 and 156 parallel with the vertical front face 149 of the front frame finish plate 144, the front partition wall 156 being part of the body 145 of the unit 20 and separating the front compartment 151 and the intermediate compartment 152, each of which is interiorly cylindrical and concentric with the cylindrical exterior surface 150. The wall 156 has formed therein a slot 157 which is symmetrical with respect to the horizontal axis of the cylindrical surface 150.

The slot 157 is vertically elongated, and has parallel vertical side faces 158 and 159 merging at opposite ends with semi-cylindrical top and bottom faces 160 and 161, as best shown in Fig. 33.

The back compartment 153 of the unit 20 is a socket opening forwardly into the intermediate compartment 152 and having parallel top and bottom horizontal faces 162 and 163 equally spaced on opposite sides of a horizontal plane 164 passing through the horizontal axis 150—0 of the cylindrical exterior surface 150 of the body 145, as best shown in Fig. 34.

At opposite sides of the plane 164, the intermediate compartment 152 has sectoral top and bottom faces 165 and 166 making junction with the socket faces 162 and 163, respectively, at bevelled or rounded corners 167 and 168.

The cupped T-head 126 of the bolt 125 is generally in the shape of elongated rectangular parallelopiped symmetrical with respect to the axis 150—0, and having rounded corners. The T-head 126 has parallel side faces 169 and 170 which are spaced from each other a distance less than the spacing of the side faces 158 and 159 of the slot 157; and the T-head 126 has parallel end faces 171 and 172 which are spaced from each other a distance less than the distances from each other of the nearest portions of the top and bottom faces 160 and 161 of the slot 157. In other words, when the T-head 126 is positioned as in Figs. 30, 31, 33 and 34, there is substantial clearance between the T-head 126 and slot 157.

As above stated, the T-head 137 slidably fits in the cup 139 of the T-head 126, and the T-head 137 has side faces 173 and 174 which are spaced from each other a distance slighlty less than is the distance between the socket faces 162 and 163.

The unit 19 of the door and frame engaging mechanism may be more definitively termed an anchor and push unit, and the unit 20 of the door and frame engaging mechanism may be more definitively termed a detent and thrust reacting unit. In a similar and more definitive manner, the cupped T-head 126 may be termed an anchor and push T-head; the partition wall 154 may be termed a slotted detent wall; the sectoral top and bottom faces 162 and 163 may be termed thrust reacting faces; the socket compartment 152 may be termed an anti-twist socket; and the T-head 137 may be termed an anti-twist T-head.

The anchor and push unit 19 may also be termed a separable push-pull rectilinear thrust mechanism or unit.

In the complete vault door construction 10, the separable door and frame engaging mechanism is operated in co-ordination with the hinge mechanisms 16 and 17, and other parts, as is hereinafter described in detail.

However, the door and frame engaging mechanism, as thus far described is capable of independent use, and manual operation, as follows:

Referring to Figs. 30 and 33, the door 13 has been moved to a position in which the T-head 126 with its side faces 169 and 170 in the vertical position and in generally parallel alignment with the vertical side faces 158 and 159 of the slot 157, has been pushed through the slot 157 until the back face 175 of the T-head 137, shown in Fig. 32, just touches the sectoral faces 162 and 163, shown in Fig. 34. The trigger or control plunger assembly 132 has its plunger 142 seated in the socket 143 of the door front plate 26, thus preventing any turning of the assembly 132 and the bolt 125, and preventing any further backward movement of the shaft 133 and the spring pressed T-head 137 thereon.

When, however, the door 13 is pushed a slight distance further towards the frame 11, to the position shown in Fig. 31, the assembly 132 remains horizontally stationary, and the door front plate 26 moves horizontally to a position in which the socket 143 is disengaged from the plunger 142. The assembly 132 and parts rotatable therewith are then free to rotate, the actuating lever 141 being in the upper position shown in Fig. 56.

If a twisting or turning force or torque is then applied to the operating and stop disk 130, the lever 141 and parts movable therewith will turn through an arc of 90° to the position of the disk 130 shown in Fig. 26. The disk 130 has formed in its outer periphery a curved outwardly opening stop recess 176, and a spring loaded ball 177 is mounted on the door front plate 26 and projects from the front face thereof at a position so as to be received by the stop recess 176 of the disk 130 at the relative positions of the parts shown in Fig. 26, and which positions other parts as shown in Figs. 32 and 59.

Figure 25:
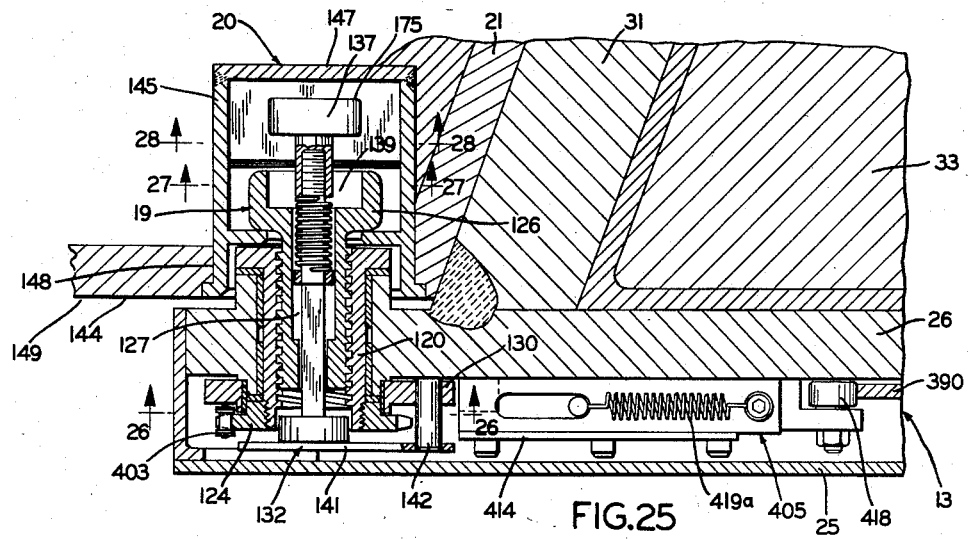
Fig. 25 is an enlarged fragmentary transverse sectional view, as on line 25—25, Fig. 22, showing details of the separable door and frame engaging mechanism, after its operation to plug seal the door, and before the lock slide bolt of the door and frame engaging mechanism has been extended to the locking position shown in Fig. 22.

The sprocket 124 is then rotated so as to turn the nut 120 and screw the bolt 125 in the nut 120, the anchor and push T-head 126 pulling against the back face 156 of the slotted detent wall 154, and the anti-twist T-head 137 advancing into the anti-twist socket 153, until the parts have attained the relative positions shown in Fig. 25, in which the door 13 is plug-sealed in the opening of the door frame 11.

Reversing the above described cycle of operations of the door and frame engaging mechanism serves to return the parts from the engaged positions shown in Figs. 25 and 52 to the disengaged positions shown in Figs. 30 and 56.

IV. THE BOLT WORK

The improved vault door construction 13 includes improved bolt work 22 and associated parts which are best illustrated in Figs. 1, 3, 4, 6, 7, 8, 9, and 35 to 51 inclusive.

As above described, the door frame 11 includes a composite frame side member 21 composed of a sloping seal member 21—1 and a vertical front frame finish plate 144. The door frame 11 also includes a composite frame side member 15 including a seal member 180 which slopes from front to rear laterally from the larger front end opening of the frame to the smaller rear end opening thereof. The composite member 15 also includes a vertical front frame finish plate 181 which mounts the lower housing and bearing block 37 of the top hinge mechanism 16 and the lower housing and bearing block 77 of the bottom hinge mechanism 17.

At the back end of the sloping frame seal member 21—1 there is secured a wedge bar 182 extending longitudinally the length of the seal member 21—1 and making an inner side junction therewith at the longitudinally extending corner 183. The wedge bar 182 extends laterally outwardly from the corner 183.

At the back end of the sloping frame seal member 180 there is secured a wedge bar 184 extending longitudinally the length of the seal member 180 and making an inner side junction therewith at the longitudinally extending corner 185.

Figure 7:
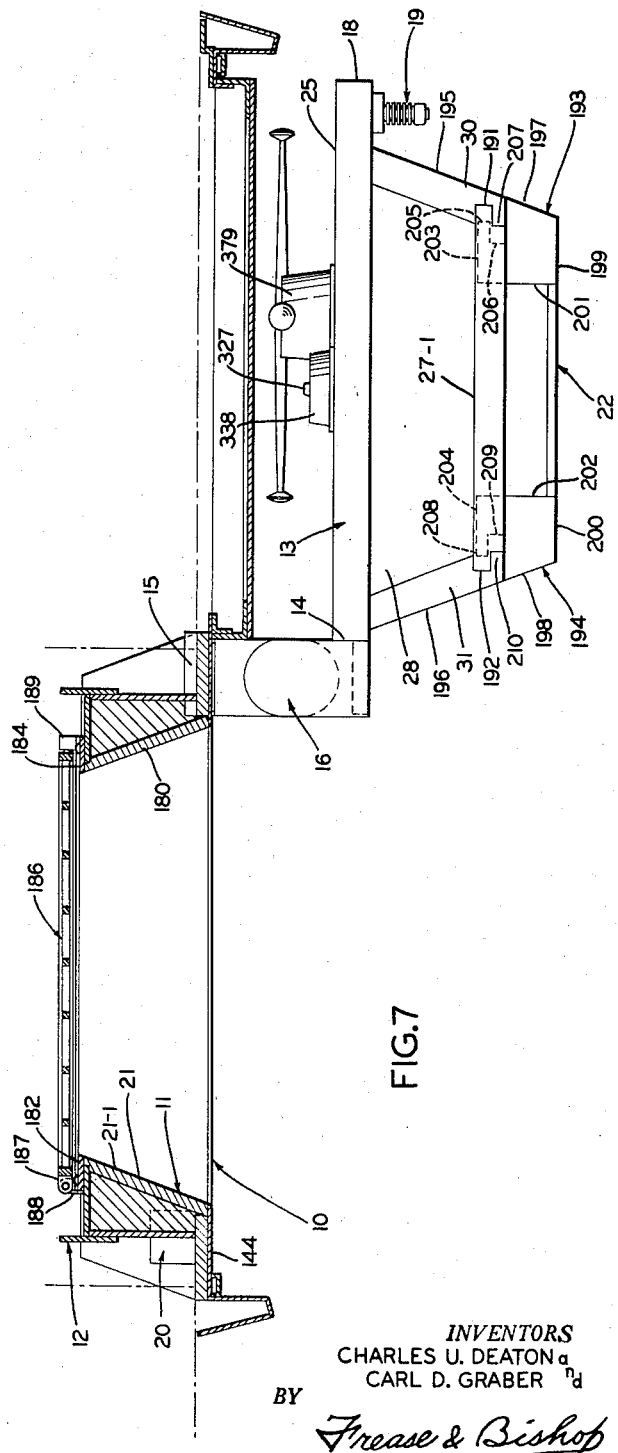
Fig. 7 is an enlarged horizontal sectional view of the door and frame, as on line 7—7, Fig. 4, looking in the direction of the arrows.

A rectangular day-gate indicated generally by 186 includes a hinge side member 187. Hinges 188 connect the day-gate hinge side member 187 to the wedge bar 182 at positions laterally spaced from the corner 183. The day-gate 186 also includes a lock catch side member 189 which overlaps the wedge bar 184, when the vault door 13 is open and the day-gate is closed, as best shown in Fig. 7.

When the day-gate is open and the vault door is closed as shown in Fig. 6, the cleared portions of the wedge bars 182 and 184 extending laterally from the corners 183 and 185, constitute vertical keeper wedge bars extending from top to bottom of the rear end opening of the door frame 11.

The bolt work 22 is operatively mounted on the back plate 27 of the door case, and the door case side members 30 and 31 project beyond the back plate outer face 27—1, and the door case side members 30 and 31 have formed therein, respectively, beyond the back plate outer face 27—1, laterally opening longitudinally extending vertical grooves 191 and 192.

At the sides of the door case back plate 27, there are operatively mounted in a novel manner vertical bolt bars 193 and 194, which extend longitudinally from top to bottom of the door case. The bolt bar 193 is located at the swinging side of the door adjacent the door case side member 30, and the bolt bar 194 is located at the hinge side of the door adjacent the door case side member 31.

The door case side members 30 and 31 are formed, respectively, with laterally sloping outer faces 195 and 196 which complement and fit with the outer sloping faces of the door frame seal members 21—1 and 180, when the door 13 is closed in the opening of the frame 11.

In Fig. 6, the door 13 is shown closed in the opening of the door frame 11, and the bolt bars 193 and 194 are shown in their laterally extended positions overlapping the door frame keeper wedge bars 182 and 184.

In Fig. 7, the door 13 is shown swung to the fully open position, with the bolt bars 193 and 194 in their laterally retracted positions. The bolt bar 193 has a longitudinally extending side face 197 which has the same lateral slope as that of the door case outer side face 195, and in the retracted position of the bolt bars, the bolt bar side face 197 is aligned with the door case side face 195. Similarly, the bolt bar 194 has a longitudinally extending side face 198 which has the same lateral slope as that of the door case outer side face 196, and in the retracted position of the bolt bars, the bolt bar side face 198 is aligned with the door case side face 196.

The bolt bars 193 and 194 are formed respectively with co-planar back faces 199 and 200, opposite inner side faces 201 and 202, and co-planar front faces 203 and 204. The back faces 199 and 200 are parallel with the front faces 203 and 204, and the inner side faces 201 and 202 are perpendicular to the front and back faces.

The outer front corner of the bolt bar 193 is formed with a front tongue 205 and an intermediate groove 206, the tongue and the groove extending longitudinally the length of the bolt bar. The tongue 205 extends laterally outwardly, and the groove 206 opens laterally outwardly.

The door case side member 30, as above stated, has an inwardly opening groove 191 formed therein, and is also formed with a laterally inwardly extending tongue 207 forming one side of the groove 191.

The bolt bar tongue 205 is aligned with and extends into the door case side member groove 191, and the door case side member tongue 207 is aligned with and extends into the bolt bar groove 206.

Similarly the outer front corner of the bolt bar 194 is formed with a front tongue 208 and an intermediate groove 209, the tongue and the groove extending longitudinally the length of the bolt bar. The tongue 208 extends laterally outwardly, and the groove 209 opens laterally outwardly.

The door case side member 31, as above stated, has an inwardly opening groove 192 formed therein, and is also formed with a laterally inwardly extending tongue 210 forming one side of the groove 192.

The bolt bar tongue 208 is aligned with and extends into the door case side member groove 192, and the door case side member tongue 210 is aligned with and extends into the bolt bar groove 209.

Figure 41:
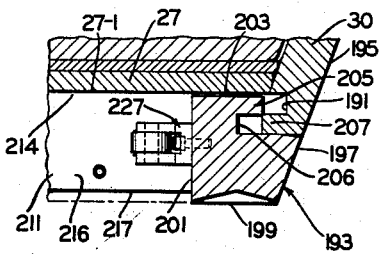
Fig. 41 is a fragmentary transverse sectional view thereof as on line 41—41, Fig. 40, looking in the direction of the arrows.
Figure 42:
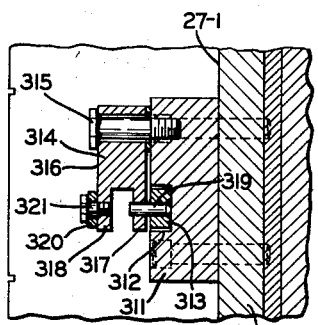
Fig. 42 is a fragmentary vertical sectional view thereof, as on line 42—42, Fig. 40.
Figure 36:
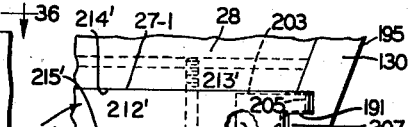
Fig. 36 is a fragmentary top plan view thereof, as on line 36—36, Fig. 35, looking in the direction of the arrows.
Figure 37:
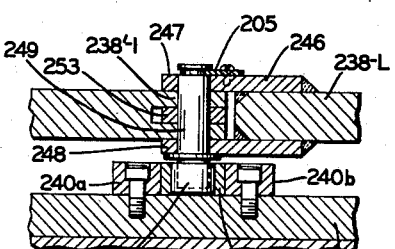
Fig. 37 is a fragmentary plan sectional view thereof, as on line 37—37, Fig. 35, looking in the direction of the arrows.

The immediately foregoing details of construction are best shown in Figs. 3, 6, and 7, and in Figs. 36 and 41.

Figure 40:
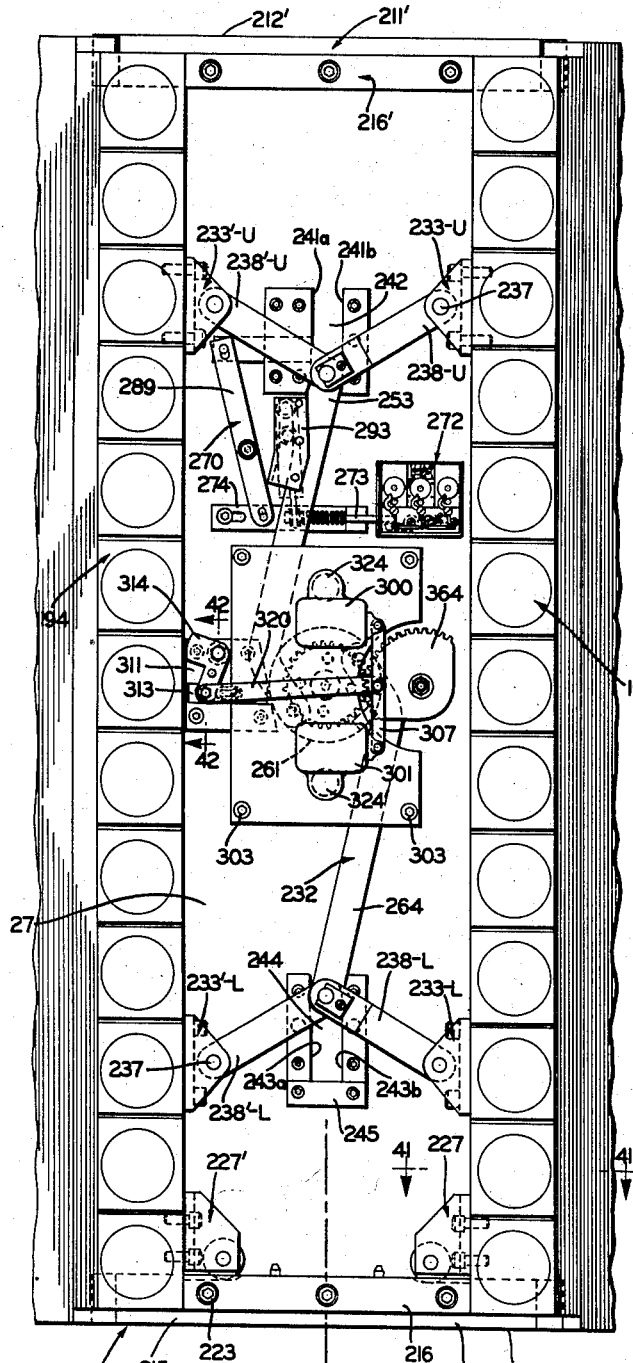
Fig. 40 is a view similar to Fig. 35, showing the bolt bars in the retracted position.
Figure 35:
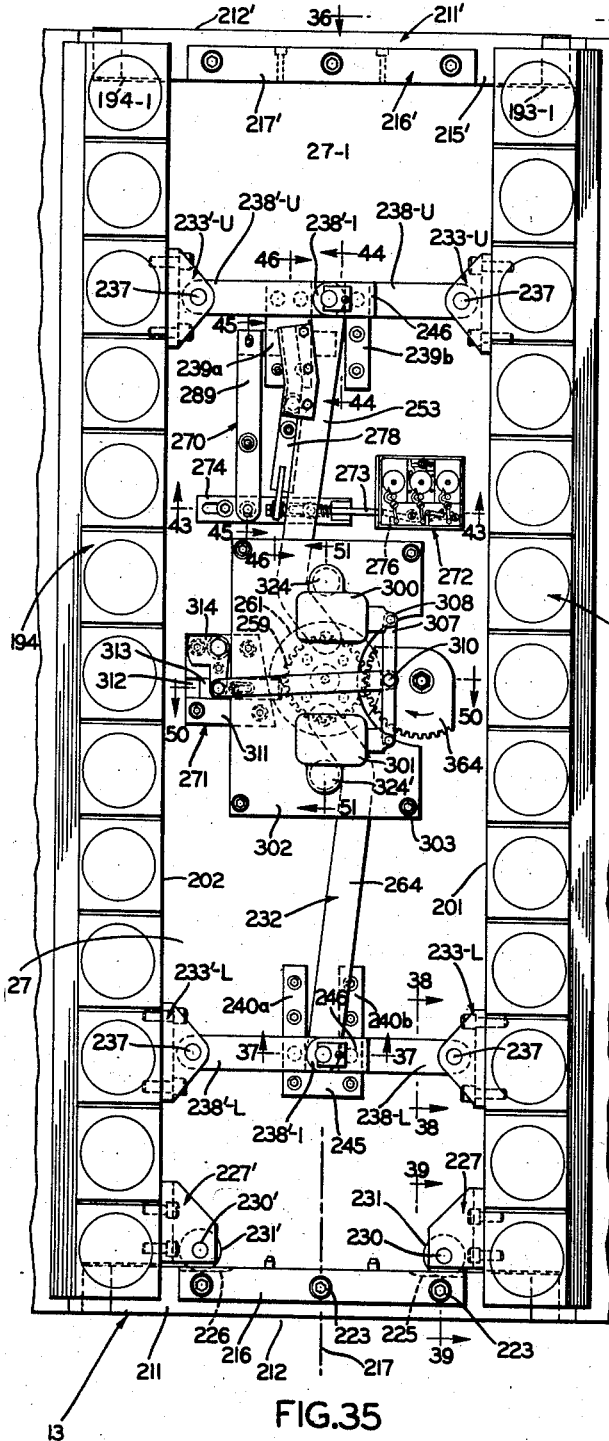
Fig. 35 is an enlarged fragmentary view of the rear of the door with the bolt or wedge locking bars in the extended position, and the rear cover plate removed, and showing the bolt work and associated parts.

Referring in particular to Figs. 35 to 41, inclusive, and more particularly to Figs. 35 and 40, at the lower end of the door 13 there is located a laterally extending elongated spacer bar 211 having a rectangular cross-section and a bottom face 212 aligned with the bottom face 213 of the door case bottom member 29.

Figure 39:
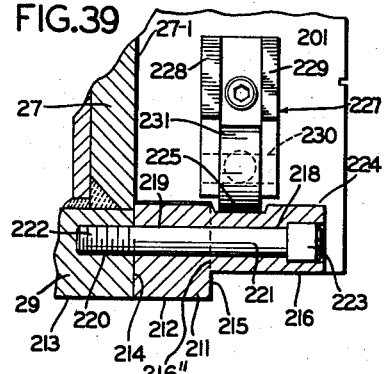
Fig. 39 is another fragmentary sectional view thereof, as on line 39—39, Fig. 35, looking in the direction of the arrows.

The front face 214 of spacer bar 211 abuts the back face of door case bottom member 29, Fig. 39. The bottom face 213 of the door case bottom member 29, is aligned with the bottom face of the door case side members 30 and 31.

The top face of the door case top member 28, also is aligned with the top faces of the door case side members 30 and 31, Fig. 36.

The spacer bar 211 also has a back face 215, and an elongated track bar 216 has a front face 216″ (Fig. 39) abutting or integral with the back face 215 of the spacer bar 211, the track bar being in side by side alignment with the spacer bar 211 and having a length substantially less than the length of the spacer bar. The track bar 216 extends equal distances from opposite sides of a vertical median plane perpendicular to the back face 27—1 of the door case back plate 27, and indicated by the dot-dash line 217 in Figs. 35 and 40.

The track bar 216, and the spacer bar 211 have formed therein a plurality of sets of registering bores, each set including a countersunk bore 218 in the track bar 216 and a bore 219 in the spacer bar 211, and the bores 218 and 219 of each set register with an internally threaded socket 220 formed in the door case bottom member 29. A plurality of cap screws 221 secure the track bar 216 and the spacer bar 211 to the door case back plate 27, each cap screw 221 having a threaded shank 222 extending through one of the sets of registering bores 218 and 219 and screwed into the registered socket 220, and each cap screw 221 having a head 223 located in the countersink of the associated bore 218 and clamping the track bar 216 and spacer bar 211 against the door case back plate 27, as shown in Fig. 39.

The track bar 216 has an upper face 224 in the opposite ends of which there are formed track grooves 225 and 226. At the lower end of the bolt bar 193 there is mounted a U-shaped shaft hanger block 227 having laterally extending legs 228 and 229 which have formed therein horizontally aligned bores in which are mounted the ends of a shaft 230. A wheel 231 is located between the block legs 228 and 229, and the wheel 231 has a central bore through which the shaft 230 extends.

The wheel 231 is externally cylindrical and is supported by and rolls on the track bar 216. As shown, the wheel 231 rolls in and is guided by the track grove 225. The load applied to the wheel 231 by the supported bolt bar 193 is thus eccentric to the axis of rotation of the wheel 231.

At the upper end of the door 13, there is located a laterally extending elongated spacer bar 211′ having a rectangular cross-section and a top face 212′ aligned with the top face 213′ of the door case top member 28. The front face 214′ of the spacer bar 211′ abuts the back face of door case top member 28, Fig. 36. The top face 213′ of the door case top member 28 is aligned with the top faces of the door case side members 30 and 31.

The upper spacer bar 211′ also has a back face 215′, and an elongated clamp and stop bar 216′ has a front face 217′ abutting the back face 215′ of the spacer bar 211′, the clamp and stop bar 216′ being in side-by-side alignment with the spacer bar 211′ and having a length substantially less than the length of the spacer bar.

The clamp and stop bar 216′ and the spacer bar 211′ are separably secured to the upper end of the door case back plate 27, by means similar to those above described which separably secure the track bar 216 and spacer bar 211 to the door case back plate 27.

As best shown in Fig. 36, the upper end of the bolt bar 193 is formed with a front rabbet notch 193—1, and upper spacer bar 211′ extends over the notch 193—1, and acts as a hold-down for the upper end of the bolt bar 193.

Combined plumbing and moving means are provided for maintaining the eccentrically supported bolt bar 193 in laterally movable positions in each of which, each of the exterior faces of the bolt bar 193 including the side face 201 is plumb or vertical, and the combined plumbing and moving means being operative to move the bolt bar 193 laterally to its extended position as shown in Fig. 35, and therefrom to its retracted position as shown in Fig. 40.

The combined plumbing and moving means is constituted in part by a multiple linkage indicated generally by 232 and including an upper pivot pin mounting block 233–U and a lower pivot pin mounting block 233–L each being secured to the bolt bar 193 and extending from its side face 201 towards the median plane 217.

Figure 38:
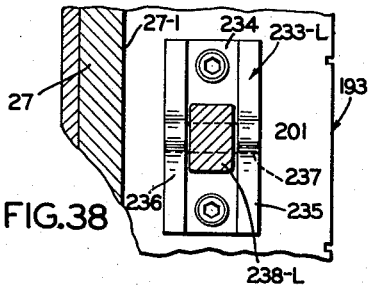
Fig. 38 is a fragmentary vertical sectional view thereof, as on line 38—38, Fig. 35, looking in the direction of the arrows.

Each of the blocks 233–U and 233–L is of identical construction, and the block 233–L is described in detail with particular reference to Fig. 38, as follows: The block 233–L has a cross-section which is generally U-shaped, and includes a back web 234 which abuts against the side face 201 of the bolt bar 193. Spaced legs 235 and 236 extend laterally from the back web, and the legs 235 and 236 have formed therein aligned bores which support the ends of a pivot pin 237.

The multiple linkage 232 furthermore includes an upper cross link bar 238–U and a lower cross lnik bar 238–L. The outer end of the upper cross link bar 238–U is located between the legs of the upper block 233–U and has a bore formed therein through which extends the pin 237 in the upper block. Similarly, the outer end of the lower cross link bar 238–L is located between the legs of the lower block 233–L and has a bore formed therein through which extends the pin 237 in the lower block.

As parts co-acting with the multiple linkage 232, there are mounted on the door case back plate 27, a set of upper roller guide blocks 239a and 239b, and a set of lower roller guide blocks 240a and 240b. The upper blocks 239a and 239b, have, respectively, opposite inner vertical side faces 241a and 241b, equally spaced on opposite sides of the median plane 217 and forming therebetween an upper vertical roller guide groove 242.

The lower blocks 240a and 240b have, respectively, opposite inner vertical side faces 243a and 243b equally spaced on opposite side faces of the median plane 217 and forming therebetween a lower vertical roller guide groove 244. In abutment with the lower ends of the blocks 240a and 240b, there is secured to the door case back plate 27 a roller stop block 245.

On the inner end of each of the link bars 238–U and 238–L, that is, the ends thereof spaced from blocks 233–U and 233–L, there is constructed a clevis 246 including an outer leg 247 and an inner leg 248 having aligned bores formed therein, and outer portions of a pin 249 are located in the bores of the clevis legs 247 and 248 and secured in the clevis as by an outer arcuate securing plate 250 separably connected on the outer face of the outer clevis leg 247 and engaging an outwardly opening groove in the outer end of the pin 249 extending above the upper clevis leg 247.

The inner end of the pin 249 extends beyond the inner clevis leg 248 and has a journal and thrust cup 251 secured thereon, and a roller 252 is journalled on the cup 251 and rolls between the guide block side faces for the particular upper or lower roller. The bottom of each of the upper and lower grooves 242 and 244 formed by the upper and lower roller guide blocks, serves as a slide bearing for the bottom circular thrust face of the particular cup 251 operating in the particular groove.

The multiple linkage 232 furthermore includes an upper connecting link bar 253, the upper end of which is located between the upper clevis legs 247 and 248, and has a bore formed therein through which extends the outer portion of the pin 249.

Referring in particular to Figs. 50 and 51, and again to Figs. 35 and 40, substantially at the center horizontal axis of the door indicated by the dot-dash line 254 in Fig. 51, there is mounted a stub shaft 255 having an inner externally threaded end 256 screwed into an internally threaded socket formed in the door case back plate 27. The shaft 255 furthermore includes an intermediate annular shoulder 257 which seats against the outer face 27—1 of the back plate 27. The shaft 255 also mounts on its outer end, needle bearings 258 which mount a gear wheel 259.

From the outer face of the gear wheel 259, there protrudes a pilot boss 260 having an externally cylindric surface concentric with the axis 254, and a crank disk 261 has a central cylindrical opening 262 formed therein which fits on the pilot boss 260, the inner face of the disk 261 abutting the outer face of the gear wheel 259, and means being provided which secure the disk 261 to the gear wheel 259.

From the upper side of the disk 261, there extends outwardly an upper crank pin 263, and the lower end of the upper connecting link bar 253 has a bore formed therein which fits on the upper crank pin 263.

As above stated, the lower cross link bar 238–L also has a clevis 246 constructed on its inner end, that is the end of bar 238–L spaced from block 233–L, with clevis 246 mounting a clevis pin 249 on the inner end of which there is mounted a journal and thrust cup 251 journalling a roller 252 which rolls in the lower groove 244.

A lower connecting link bar 264 has its lower end located between the legs of the lower clevis 246 and formed with a bore through which extends the outer portion of the lower clevis pin 249.

The crank disk 261 also mounts a lower crank pin 265, and the upper end of the lower connecting link bar 264 is formed with a bore which fits on the lower crank pin 265.

The multiple linkage 232 and associated parts as so far described, constitute an independent and complete combined plumbing and moving means operatively associated with the vertical bolt bar 193, and actuatable by reverse quarter rotations of the crank disk 261 to move the bolt bar 193 laterally back and forth between the positions shown in Figs. 35 and 40.

At the lower end of the bolt bar 194, there is mounted a U-shaped shaft hanger block 227' which is identical in construction with the block 227 but reversed sideways. The block 227' mounts a shaft 230' and a wheel 231' which is supported by and rolls on the track bar 216. As shown the wheel 231' rolls in and is guided by the track groove 226. The load applied to the wheel 231' by the supported bolt bar 194 is thus eccentric to the axis of rotation of the wheel 231'.

As best shown in Fig. 35, the upper end of the bolt bar 194 is formed with a front rabbet notch 194—1, and upper spacer bar 211' extends over the notch 194—1, and acts as a hold-down for the upper end of the bolt bar 194.

Combined plumbing and moving means are provided for maintaining the eccentrically supported bolt bar 194 in laterally movable positions in each of which each of the exterior faces of the bolt bar 194 including the side face 202 is plumb or vertical, and the combined plumbing and moving means being operative to move the bolt bar 194 laterally to its extended position as shown in Fig. 35, and therefrom to its retracted position as shown in Fig. 40.

The combined plumbing and moving means for the bolt bar 194 includes linkage parts connected with parts of the multiple linkage 232, as follows: An upper pivot pin mounting block 233'–U and a lower pivot pin mounting block 233'–L are secured to the bolt bar 194 and extend from its side face 202 towards the median plane 217.

Each of the blocks 233'–U and 233'–L are identical in construction with the block 233–U and 233–L, but reversed sideways.

Each block 233'–U and 233'–L supports a pin 237. An upper cross link bar 238'–U has its outer end located between the legs of the upper block 233'–U and has a bore formed therein through which extends the pin 237 in the upper block. The inner end of the upper cross link bar 238'–U is formed as a clevis 238'—1, the legs of which fit between the legs of the clevis 246 of the upper cross link bar 238–U. The legs of the clevis 238'—1 have formed therein aligned bores which register with the aligned bores of the upper clevis 246. The upper end of the upper connecting link bar 253 fits between the legs of the upper clevis 238'—1 and its bore is aligned with the bores of the legs of the upper clevises 246 and 238'—1, and the upper pivot pin 249 extends through all of the aligned bores.

Similarly, a lower cross link bar 238'–L has its outer end located between the legs of the lower block 233'–L and has a bore formed therein through which extends the pin 237 in the lower block. The inner end of the lower cross link bar 238'–L is formed as a clevis 238'—1, the legs of which fit between the legs of the clevis 246 of the lower cross link bar 238–L. The legs of the clevis 238'—1 of the lower cross link bar 238'–L have formed therein aligned bores which register with the aligned bores of the lower clevis 246. The lower end of the lower connecting link bar 264 fits between the legs of the lower clevis 238'—1, and its bore is aligned with the bores of the legs of the lower clevises 246 and 238'—1, and the lower pivot pin 249 extends through all of the aligned bores.

The multiple linkage formed by the pivot pin connected, crank disk 261, the upper and lower connecting link bars 253 and 264, the upper and lower cross link bars 238'–U and 238'–L, and the upper and lower blocks 233'–U and 233'–L and other co-acting parts constitute independent combined plumbing and moving means for the bolt bar 194.

The inclusion of the crank disk 261 and the upper and lower connecting link bars 253 and 264 in the linkage 232 constitutes a pair of co-acting linkages having common actuating parts for simultaneously plumbing and moving the bolt bars 193 and 194.

In the improved vault door construction 10, after the bolt bars 193 and 194 have been moved laterally to the extended positions shown in Figs. 3, 6, 35, and 36, the vault door 13 is bolted in the opening of the door frame 11, and two stop mechanisms indicated generally by 270 and 271, respectively, are provided for blocking operation of the plumbing and moving means associated with the bolt bars 193 and 194 to move the bolt bars from the extended position to the retracted position.

The stop mechanism 270 is operatively mounted on the back face 27—1 of the door case back plate 27 and is located above the stub shaft 255 and below the upper cross link bars 238–U and 238'–U. Most of the parts of the stop mechanism 270 are located between the median plane 217 and the bolt bar 194. The stop mechanism 270 is time lock controlled by a time lock indicated generally by 272 which is mounted on the back face 27—1 of the door case back plate 27 and is located above the stub shaft 255 and below the upper cross link bar 238–U and between the median plane 217 and the bolt bar 193.

The stop mechanism 270 includes among other parts, a plunger 273 extending horizontally from a horizontal cross bar 274 mounted for horizontal movement on the door case back plate 27. At its end adjacent the time lock 272, the cross bar 274 has mounted thereon a rearwardly extending lug 275, which is spring pressed towards the time lock 272. The time lock 272 includes a stop arm 276 which in the locked position of the parts of the time lock as shown in Fig. 35, is in a position blocking movement of the plunger 273 and cross bar 274 towards the time lock. When the time lock parts have moved to the unlocked position shown in Fig. 40, the stop arm 276 has been moved to a position permitting movement of the plunger 273 into the case of the time lock.

Referring particularly to Figs. 35, 40, and 43 to 47, inclusive, the lug 275 is formed with a counter bored aperture 277. A swing bar 278 extending generally upwardly and downwardly, has a pivot mounting means 279 intermediate its ends, the pivot mounting means being secured on and extending outwardly from the door case back plate 27. At the lower end of the swing bar 278, there is secured an end piece 280 having an aperture 281 formed therein which is aligned with the aperture 277 in the lug 275.

A bolt and nut set 282 connect the end piece 280 and the lug 275, the shank of the bolt extending through the aligned apertures 277 and 281, and a helical compression spring 283 is interposed and reacts between the end piece 280 and the lug 275, and as shown the spring 283 is wound around the shank of the bolt of the set 282.

The cross bar 274 has formed therein a pair of aligned laterally spaced elongated horizontal slots 284, and a roller 285 is located in each slot 284, each roller 285 being stud mounted on the door case back plate 27.

As best shown in Fig. 44, the upper roller guide block 239a has formed therein a laterally extending forwardly opening rectangular groove 286 which with the back face 27—1 of the plate 27, forms a guide slot. A stop bar 287 extends horizontally through and is slidable in the guide slot.

Between the stop bar 287 and the cross bar 274, there is secured to and extends rearwardly from the back plate 27, a pivotal mounting means 288, and a lever bar 289 is pivotally mounted intermediate its ends on the pivotal mounting means 288. The lever bar 289 extends generally upwardly and downwardly, and the upper end of the lever bar 289 has a slot and pin connection 290 with the outer end of the stop bar 287, and the lower end of the lever bar 289 has a slot and pin connection 291 with an intermediate portion of the cross bar 274.

The upper connecting link bar 253 has an outer side face with an angled portion 292. As best shown in Fig. 47, a formed double angled plate member 293 includes an angled outer leg 294 separably secured to the link bar 253 above its angled side face portion 292. The double angled plate member 293 also includes an angled side leg 295 spaced from the angled side face portion 292 of the link bar 253, and forming therewith a forwardly opening angled groove 296 at the rear of the swing bar 278. A roller 297 rolls in the groove 296 and has a stud shaft mounting 298 on the upper end of the swing bar 278.

The time-lock controlled upper stop mechanism 270 as above described in detail, operates as follows: When the door is in the closed position as shown in Fig. 35, and the bolt work has been operated to extend the bolt bars 193 and 194 to the extended door bolting position, the stop bar 287 is located in extended position across the upper groove 242, preventing full downward movement of the upper journal and thrust cap 251, and thus preventing operation of the bolt work to retract the bolt bars. In this locked and stopped position of the bolt work, the stop mechanism 270 cannot operate to withdraw the stop bar 287 from the groove 242, until the time lock 272 has operated to drop the stop arm 276 from obstructing position with respect to the plunger 273. When this occurs, the spring pressed plunger 273 may enter the housing of the time lock.

The other lower stop mechanism 271 is controlled by two combination locks 300 and 301. Mounting means for the locks 300 and 301 consist of a lock mounting plate 302 spaced rearwardly from the door case back plate 27 and parallel thereto, and sets of spacer and connector means each including a cap screw 303 and a tube spacer 304, each spacer 304 being interposed between the plates 302 and 27, and the bore of each spacer registering with a bore in the plate 302 and an internally threaded bore in the plate 27, and the shank of each cap screw 303 extending through a set of the registering bores and being screwed in the threaded bore, and the head of each cap screw clamping against the back face of the plate 302. The locks 300 and 301 are mounted on the back face of the plate 302, and the plate 302 covers a central zone of the back plate 27 and parts thereon or extending thereon.

The combination lock 300 includes a bolt 305 extending towards the bolt bar 193, and the combination lock 301 includes a bolt 306 also extending towards the bolt bar 193. The bolts 305 and 306 are movable in parallel directions towards and away from the bolt bar 193, said directions being perpendicular to the median plane 217. A connecting bar 307 extends upwardly and downwardly between the outer ends of the bolts 305 and 306, and the upper end of the connecting bar 307 has a pivotal connection 308 with the outer end of the upper bolt 305, and the lower end of the connecting bar 307 has a pivotal connection 309 with the outer end of the lower bolt 306. The bolts 305 and 306 move in axial directions equally spaced above and below a horizontal plane passing through the horizontal axis 254 of the door.

At the midpoint of the connecting bar 307, a pivotal connection 310 is mounted. Between the median plane 217 and the bolt bar 194, a guide and pivot block 311 is mounted on the back face 27—1 of the back plate 27. The guide and pivot block 311 has formed therein a rearwardly opening horizontal groove 312 having a rectangular cross-section. A longitudinally extending bolt 313 having a rectangular cross-section slidably fits in the groove 312.

A bellcrank 314 has a pivotal mounting 315 connecting it to the block 311, the axis of pivoting being horizontal and above the bolt 313. The bellcrank 314 includes a downwardly extending arm 316 with inner and outer bifurcated end pieces 317 and 318. The inner end piece 317 has a slot and pin connection 319 with the bolt 313. A connecting bar 320 extends between the connecting bar 307 and the bellcrank outer end piece 318. One end of the connecting bar 320 is pivoted to the connecting bar 307 by the pivotal connection 310. The other end of the connecting bar 320 is pivoted to the bellcrank outer end piece 318 by a pivotal connection 321.

The bolt 313 has an inner stop end 322 which extends beyond the block 311 towards the median plane 217, and the crank disk 261 is formed with an outwardly opening radial notch 323 which becomes aligned with and receives the bolt stop end 322, when the door parts are in the positions shown in Figs. 35 and 50. In these positions, as above stated, the door 13 is closed in the opening of the frame 11, the bolt bars 193 and 194 are in their extended door bolting position, and the combination lock bolts 305 and 306 are in extended position, and maintain the bolt 313 in its extended position locking the crank disk 261 against rotation.

As best shown in Fig. 51, the upper combination lock 300 includes a gear operated combination setting mechanism of usual construction within a housing 324, and including an upper combination setting shaft 325 extending forwardly through the door 13, and as shown through a horizontal tube 326, outwardly beyond the door front face 25, where a dial knob 327 is secured on the outer end of the shaft 325.

Similarly, the lower combination lock 301 includes a gear operated combination setting mechanism of usual construction within a housing 324', and including a lower combination setting shaft 325' extending forwardly through the door 13, and as shown through a horizontal tube 326', outwardly beyond the door front face 25, where a dial knob 327' is secured on the outer end of the shaft 325'.

Referring to Fig. 49, showing preferred details of construction of the shaft 325 and associated parts, the shaft 325 is preferably provided with an annular shoulder flange 328 intermediate its ends. Tube 326 is welded at its front end to the door case front plate 26. The shaft 325 is separable from its associated parts within the housing 324. The shaft shoulder flange 328 seats against the rear end of the tube 326 within an enlarged internally threaded bore 329 formed in the door case back plate 27. An externally threaded internally flanged sleeve 330 is screwed in the bore 329 and its flange seats against the rear face of the shaft shoulder flange 328, thereby restraining the shaft 326 against endwise longitudinal movement in the door 13.

On the front face 26—1 of the door case front wall 26 there is secured an annular spacer and mounting block 331 having a central bore 332 and an externally threaded outer end portion 333 whose diameter is less than the diameter of the main body portion 334 of the block 331.

The door 13 includes a rectangular front cover shell 335 having a front wall 336 spaced forwardly from the front plate 26, and having formed therein a circular opening 337 concentric with the common horizontal axis of the shaft 325 and the main body portion 334 of the block 331. The diameter of the opening 337 is slightly less than the diameter of the block main body portion 334, and the shell front wall 336 is spaced forwardly of the front end of the body portion 334, and the threaded outer end portion 333 of the block 331 extends through the shell front wall opening 337. A cupped dial index housing 338 has an internally threaded inner end portion 339 screwed on the externally threaded outer end portion 333 of the block 331, and the housing 338 is formed with a radially outwardly extending annular flange 340 which overlaps the outer face portions of the cover shell front wall 336 about the opening 337. The housing 338 furthermore includes a frusto-conical body portion 341 extending forwardly from the flange 340 and an inverted frusto-conical outer end wall 342 extending inwardly and rearwardly from the outer end of the body portion 341 and having formed therein a central opening 343.

The forward end of the shaft 325 extends beyond the front face of the block 331 and terminates within the stationary housing 338. A sleeve mounting head 344 is secured on the forward end of the shaft 325 and is located in the bore 322 of the block 331 and extends beyond the front face thereof, short of the front end face of the shaft 325. A dial shell 345 is located within the index housing 338, the dial shell 345 having a central hub 346 connected to the sleeve mounting head 344. The dial shell 345 furthermore includes a frusto-conical disk portion 347 extending outwardly from the hub 346 and a frusto-conical rim portion 348 extending rearwardly from the outer periphery of the disk portion 347.

The disk portion 347 of the rotary dial shell 345 is adjacent the inner face of the housing frusto-conical end wall 342, the disk portion 347 and end wall 342 having similar conical angles. Also, the rim portion 348 of the dial shell 345 is adjacent the inner face of the housing frusto-conical body portion 341, the rim portion 348 and the portion 341 having similar conical angles.

The housing frusto-conical body portion 341 has formed therein an upper rectangular opening 349 having side edges 350 and 351 as shown in Fig. 49a. The outer face of the body portion 341 has inscribed therein a set of index marks 350–I intersecting the opening edge 350, and a set of index marks 351–I intersecting the opening edge 351. If any index mark 350–I were prolonged in the direction of the marks 351–I, it would extend between a pair of the index marks 351–I.

The outer face of the frusto-conical rim portion 348 of the dial shell 345 has inscribed therein a frusto-conical element 352 and a helix turn 353 extending around the outer face of the frusto-conical rim portion between the ends of the element.

The dial knob 327, secured to the end of the shaft 326, extends through the opening 343 of the housing 338.

By the above described construction of the housing 338 and dial shell 345, rapid setting of the combination of the lock 300 is attainable as is set forth in detail in a co-pending application for patent.

Referring particularly to Figs. 35, 40, 48, and 50, the rotatable spoke handle unit 24 is rotatably mounted on the front end of a main shaft 360, which through the intervention of the common operating mechanism 23, is adapted to be rotated 90° from the position shown in Fig. 35 to the position shown in Fig. 40, and the reverse, during the opening and closing cycles of operation of the several mechanisms of the door 13.

The main shaft 360 extends horizontally through the door, and as shown through a horizontal bearing tube 361. The front end portion 362 of the main shaft 360 extends forwardly beyond the front face of the cover shell front wall 336, the spoke handle unit 24 being also located beyond the front face of the cover shell front wall.

The rear end portion 363 of the main shaft 360 extends rearwardly beyond the back face 27—1 of the door case back plate 27, and a bolt work drive gear sector 364 is secured on the rear end portion 363 of the main shaft 360 beyond the back face of the back plate 27.

The drive gear sector 364 is meshed with the gear wheel 259 which in turn, as above stated, is connected to the bolt work crank disk 261.

Referring to Fig. 48, showing preferred details of construction of the man shaft 360 and associated parts, the shaft 360 is preferably provided with an annular shoulder flange 365 intermediate its ends. The bearing tube 361 is welded at its front end to the door case front plate 26. The shaft rear end portion 363 is separably connected with the drive gear sector 364. The shaft shoulder flange 365 seats or thrust reacts against the rear end of the tube 361 within an enlarged internally threaded bore 366 formed in the door case back plate 27. An externally threaded internally flanged sleeve 367 engirdles the rear end portion 363 of the shaft 360, and the sleeve 367 is screwed in the bore 366 and its flange seats against the rear face of the shaft shoulder flange 365, thereby restraining the rotatable shaft 360 against endwise longitudinal movement in the door 13.

V. COMMON OPERATING MECHANISM

The common operating mechanism 23 of the improved vault door 13 is best illustrated in Figs. 22, 48, 52 to 61 inclusive, and 69 to 71 inclusive.

As part of the means mounting the spoke handle unit 24 for rotation on the front end portion 362 of the shaft 361, there is located an internally flanged sleeve 370 on the shaft front end portion 362, the sleeve 370 including a body portion 371, and a radially inwardly extending flange portion 372 at the rear end of the body portion, and a rearwardly extending pilot end portion 373.

The inner cylindrical surface 374 of the sleeve body portion 371 is spaced radially outwardly from the outer cylindrical surface 375 of the shaft outer end portion 362, and a pair of needle bearings 376 fit on the outer cylindrical surface 375 and in the inner cylindrical surface 374. A thrust disk 377 is separably connected to the shaft outer end portion 362 and against the circular end face thereof, by a machine screw 378. The thrust disk 377 retains the front end of one of the bearings 376, and the flange portion 372 retains the back end of the other bearing 376, adjacent ends of the bearings abutting each other.

The spoke handle unit 24 includes a hub 379 having a rearwardly opening socket 380 formed therein and having an inner cylindrical face 381 fitting on the outer cylindrical face 382 of the sleeve 370.

A plurality of outwardly opening sockets 383 are formed in the sleeve body portion 371, each socket 383 having a spherical surface and seating a ball 384.

In the hub 379, for each ball 384, there is provided a radial bore 385 into the inner end of which the ball 384 extends. The outer end of each bore 385 is internally threaded and mounts an externally threaded screw sleeve 386. A compression spring and plunger unit 387 is interposed between each sleeve 386 and opposite ball 384.

A plurality of inner end connected spokes 388 are separably mounted on the hub 379. The above described spring pressed ball means interposed between the hub 379 and the sleeve 370, constitutes a safety device preventing excessive torque being applied to the sleeve 370.

The pilot end portion 373 of the sleeve 370 mounts and has secured thereto a drive sprocket 389. Between the sprocket 389 and the front face 26—1 of the door case front plate 26, there is keyed on the shaft front end portion 362, a cam and planetary sprocket mounting plate 390.

The plate 390 has formed therein a slot 391 extending perpendicular to a radius 392 and also perpendicular to the axis of rotation 393 of the shaft 360, as shown in Fig. 52.

A planetary sprocket mounting plate 394 is located in the slot 391. A bridge bar and adjusting screw mounting block 395 is mounted on and extends forwardly from the front face 390' of the cam plate 390. A pair of bridge bars 396 extend from the block 395 towards the sprocket 389. The block 395 is located radially outwardly from the slot 391. Between the slot 391 and the sprocket 389, the cam plate 390 mounts another bridge bar mounting block 397 which supports the inner ends of the bars 396.

The bars 396 bridge the slot 391 and are spaced outwardly from the planetary sprocket mounting plate 394. Between the blocks 395 and 397, the bridge bars 396 support a slide and nut block 398 which is connected to the central portion of the plate 394.

The slide and nut block 398 has formed therein an internally threaded bore 399 in which is screwed an adjusting screw 400 which is journalled and thrust resisted in the blocks 395 and 397. The longitudinal axis of the screw 400 is parallel with the radius 392, as are the longitudinal axes of the bridge bars 396.

At opposite sides of the radius 392 and equally spaced therefrom, a pair of planetary sprockets 401 are rotatably mounted on the plate 394, each as by a set of stud shaft and bearing means 402.

By the above described means, the sprockets 401 are adjustably mounted on the cam plate 390 for movement towards and away from the axis 393.

As best shown in Figs. 22 and 69 to 71 inclusive, the sprocket 73 of the top hinge 16, the sprocket 104 of the bottom hinge mechanism 17, the sprocket 124 of the door unit 19 of the door and frame engaging mechanism, the main drive sprocket 389, and each of the planetary sprockets 401, each has its teeth in engagement with links of an endless chain 403 which passes over outer peripheral portions of the sprockets 73, 104, and 124, and over opposed peripheral portions of the sprockets 401 and the sprocket 389. The chain 403 extends downwardly from the top hinge sprocket 73 and cross-wise in a sloping direction of the front face 26—1 of the door case front plate 26, to the planetary sprocket 401 nearest the sprocket 73, and thence in a right angle direction to the drive sprocket 389, and thence in 180° reverse turn to the other planetary sprocket 401, and thence in a downwardly and laterally sloping direction to the bottom hinge sprocket 104, and thence in a reverse angled turn to the door unit sprocket 124, and thence in an angle turn to the top hinge sprocket 73.

The cam plate 390 has peripheral cam follower actuating faces which may be described with references to radial lines R–1, R–2, R–3, R–4, R–5, and R–6 extending through the cam axis of rotation 393, and shown in Fig. 56. The successive radial lines are located clockwise in these figures.

Between radial lines R–1 and R–2, there is an angle of more than 180° and less than 270°. Between radial lines R–3 and R–6, there is an angle of more than 90° and less than 180°. Radial line R–1 terminates at a corner C–1 of the cam periphery, and radial line R–2 terminates at a corner C–2 of the cam periphery.

The cam lobe I between the lines R–1 and R–2 has an actuating face I–f which is a cylindrical sector having a notch recess I–f1 formed therein intermediate its ends.

The cam lobe II between the lines R–3 and R–4 has an actuating face II–f which is also a cylindrical sector.

The cam lobe IV between the lines R–5 and R–6 has an actuating face IV–f which is also a cylindrical sector.

The cam lobe III between the lines R–4 and R–5 has an actuating face III–f extending between one end of the face II–f to the adjacent end of the face IV–f, the face III–f being angled with respect to the faces II–f and IV–f.

Of the three cylindrical sector actuating faces I–f, II–f, and III–f, the face II–f has the maximum radius, the face I–f has the minimum radius, and the face IV–f has a radius intermediate between the maximum and minimum.

In other words, the face II–f is radially off set outwardly from the face I–f, and the face IV–f is radially off set inwardly from the face II–f and outwardly from the face I–f. The face III–f slopes radially inwardly from its junction with the face II–f to its junction with the face IV–f.

The axes of the two stud shaft means 402a and 402b are parallel with the axis of rotation 393 of the cam plate 390. The smaller angle between a plane passing through the axis of the stub shaft means 402a and the axis 393, and a plane passing through the axis of the stub shaft means 402b, and the axis 393 is substantially 90°, and in operation the cam plate 390 is swung back and forth intermittently through angles of 90°.

The axis of the stub shaft means 402a is substantially vertically below the cam axis 393 in one position of the cam plate 390 as shown in Figs. 56 and 59, and is substantially horizontally to the left of the axis 393 in the other position of the cam plate 390, as shown in Fig. 52.

The stub shaft means 402a is located in the sectoral cam lobe II, and the stub shaft means 402b is located in the sectoral cam lobe IV.

Spring pressed chain lug operated detent means indicated generally by 404 are operatively mounted on the front face 26–1 of the door case front plate 26, at the right of the cam plate 390, as best shown in Figs. 52, 56, and 59.

Spring pressed cam operated detent means indicated generally by 405 are operatively mounted on the front face 26–1 of the door case front plate 26, at the left of the cam plate 390, as best shown in Figs. 52, 56, and 59.

The spring pressed chain lug operated detent means indicated generally by 404, as shown, includes a detent guide case 406 separably secured on the front plate 26, and slidably mounting for horizontal movement on the front plate front face 26–1, an elongated detent 407 including a back detent portion 408 and a front lug actuated tongue 409.

The detent portion 408 has an inner end face 410 which rides against the cam lobe face I–f and intermittently enters and is withdrawn from the notch I–f1. When the end face 410 enters the cam notch I–f1, the cam plate 390 is locked against rotation, as best shown in Figs. 56 and 60.

The tongue 409 has a blunt pointed front end 411 located immediately under the portion of the chain 403 passing around the drive sprocket 389.

Compression spring and guide means 412 are interposed between the outer end of the detent 407 and the inner face of the outer end wall of the guide case 406.

An actuating lug 413 is carried on the underside of one of the links of the chain 403, and as shown in Figs. 60 and 61, the lug 413 is adapted to operate against the tongue front end 411 and push the detent portion inner end face 410 out of the cam plate notch I–f1, as the chain passes around the drive sprocket 389 in a clock-wise direction.

The spring pressed cam operated detent means indicated generally by 405, as shown, includes a detent guide case 414 separably secured on the front plate 26, and slidably mounting for horizontal movement on the front plate front face 26–1, an elongated detent 415 having an outer tapered detent end 416 and an inner cam follower end 417.

As best shown in Fig. 53, the cam follower end 417 of the detent 415 is spaced above the front plate front face 26–1 and supports from its back side, a cam follower roller 418, which rolls against the cam actuating faces II–f, III–f and IV–f, for intermittently moving the detent 415 horizontally back and forth between the position shown in Figs. 56 and 59, and the position shown in Fig. 52.

In the position of the detent 415 shown in Figs. 56 and 59, the outer tapered detent end 416 is withdrawn from engagement between teeth of the sprocket 124; whereas in the position of the detent 415 shown in Fig. 52, the outer tapered detent end 416 is entered into engagement between a pair of teeth of the sprocket 124, thereby locking the same against rotation.

As shown, two sets of tension spring and connecting means 419a and 419b are operatively interposed between the case 414 and the detent 415, and urge the roller 418 against the cam faces II–f, III–f, and IV–f.

Beneath that portion of the chain 403 extending between the drive sprocket 389 and the bottom hinge sprocket 104, there is mounted on the front plate front face 26–1, chain stop block 420. Likewise, beneath that portion of the chain 403 extending between the sprocket 124 and the bottom hinge sprocket 104, there is mounted on the front plate front face 26–1, a chain stop block 421.

Figure 69:
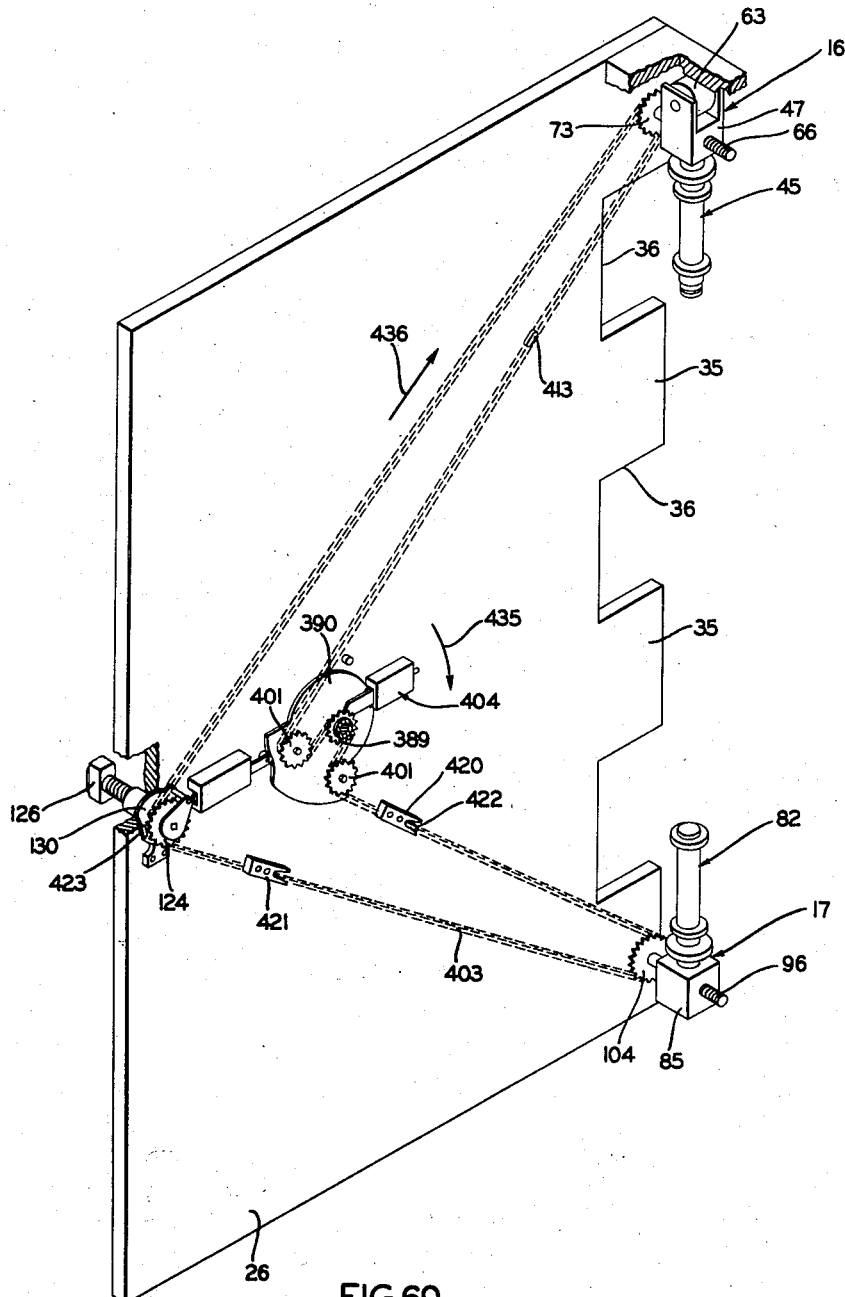
Fig. 69 is a fragmentary isometric view of certain parts of the improved door construction, some of the parts being shown schematically in dash lines, and showing the relative positions of the illustrated parts when the door is ready to be opened or is ready for seal-plugging in the door frame.

A chain stop lug 422 extends rearwardly from the under side of one of the links of the chain 403, and the longitudinal movement of the chain 403 in one direction is stopped by abutment of the lug 422 with the stop block 421, as shown in Figs. 52, 59, 70, and 71, and longitudinal movement of the chain 403 in the other direction is stopped by abutment of the lug 422 with the stop block 420, as shown in Figs. 56 and 69.

Figure 68:
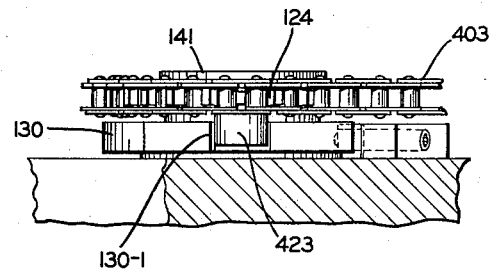
Fig. 68 is an enlarged fragmentary elevational view, looking in the direction of the arrows 68—68, Fig. 56.

In addition to the first actuating lug 413, a second actuating lug 423 extends rearwardly from the underside of one of the links of the chain 403, and when the chain is in the position shown in Figs. 56 and 69, the actuating lug 423 has passed part way around the sprocket 124, and is engaged in a lug notch 130–1 formed in the periphery of the operating and stop disk 130, as best shown in Fig. 68.

The operating and stop disk 130, in addition to the stop face 176, has a second stop face 130–2 spaced 90° from the stop face 176, as best shown in Fig. 26. The stop faces 176 and 130–2, co-acting with the stop member 177, limit the alternate movements of the disk 130 to 90° in each direction.

For limiting the rotary movements of the cam plate 390 to 90° in each direction, a stop pin 424 extends outwardly from the front plate 26 above and to the right of the drive sprocket axis of rotation 393, and a stop pin 425 extends outwardly from the front plate 26 below and to the right of the axis 393 as shown in Figs. 52, 56, and 59. The cam plate 390 has a stop face 426 extending between the corner C–1 and the adjacent end of the actuating face IV–f, and the cam plate 390 also has a stop face 427 extending between the corner C–2 and the adjacent end of the actuating face II–f. The stop faces 426 and 427 are perpendicular to each other, and the stop face 426 abuts the top stop pin 424 when the cam plate 390 is in the position shown in Figs. 52 and 70, and the stop face 427 abuts against the bottom stop pin 425 when the cam plate is in the position shown in Figs. 56, 59, 69 and 71.

As above described, the door 13 includes a front cover shell 335 covering parts protruding forwardly from the door case front plate 26. Referring to Figs. 8 and 9, and 62 to 67, inclusive, the front cover shell 335 includes in addition to the front wall 336, a top flange 336—1, a bottom flange 336—2, a hinge side flange 336—3, and a swinging side flange 336—4.

Top and bottom sets of crane hinge means 428a and 428b are operatively interposed between the door case front wall 26 and the cover shell front wall 336 at the hinge side of the door 13. Each set of crane hinge means 428a and 428b is identical.

Referring to the set of crane hinge means 428a shown in detail in Figs. 62 to 67, inclusive, this set of crane hinge means 428a includes a swinging crane plate 429 having at one side a hinge connection 430 with the door case front plate 26, and at the other side a hinge connection 431 with the cover shell front wall 336.

The shell front wall swinging side flange 336—4 has a plurality of separable inwardly extending pins 432, each of which is separately inserted in a side opening socket 26—2 formed in the swinging side face 26—3 of the door case front plate 26, as best shown in Fig. 67.

The hinge side flange 336—3 of the cover shell 335, as best shown in Fig. 66, has formed therein a plurality of internally threaded bores 336—3—1 in each of which is screwed an inwardly extending set screw 433. For each set screw 433, there is mounted on the front plate 26, a forwardly protruding side opening sleeve 434, the bore of which separably receives the inner end of the associated set screw 433.

When the cover shell 335 is closed as shown in Fig. 62, the pins 432 are in their sockets 26—2, and the inner ends of the set screws 433 are in the bores of their sleeves 434.

After removing the spoke handle unit 24, and the dial index housings 338, and the dial knobs 327, and the dial shells 345, the cover shell 335 is made ready for opening by unscrewing the set screws 433 from engagement with the sleeves 434, after which the cover shell may be swung to the position shown in Fig. 63. Then the swinging flange pins 432 may be released from engagement with the sockets 26—2, by side wise and further swinging movement to the position shown in Fig. 64. Then the cover shell 335 may be swung outwardly to any desired open position, as shown in Fig. 65.

*Operations cycles*

The operations cycle in pressure fitting or plug sealing the door 13 in the opening of the door frame 11, and then throwing the bolt work so as to extend the bolt bars 193 and 194 to the door bolting positions, best shown in Figs. 3, 6, 35, and 36, is as follows:

Referring particularly to Figs. 22, 48, and 69, the time lock 271 and the combination locks 300 and 301 being unlocked, and the bolt work being unstopped, and the bolt bars 193 and 194 being in their retracted positions as shown in Fig. 40, and the door having been swung to its initially closed position as shown in Fig. 30, the operator standing facing the door pushes the door to the position shown in Fig. 31 and thereby releases the control plunger 142 so as to permit rotation of the sprocket 124 and the operating disk 130.

The operator then turns the spoke handle unit 24, clockwise or downwardly with respect to the operator's right hand. This turns the sleeve 370 and the drive sprocket 389 thereon in the clockwise direction indicated by the arrow 435 in Fig. 69, and moves the chain 403 in the direction of the arrow 436 in Fig. 69.

This movement of the chain 403 turns each of the sprockets 124, 73, and 104 clockwise. The operating disk 130 immediately turns with the sprocket 124 from the position shown in Fig. 69 to the position shown in Fig. 71, thereby turning the plunger assembly 132, 90° to the position shown in Fig. 32, in which position the disk 130 is stopped as shown in Fig. 26.

Further turning of the spoke handle unit 24 rotates the sleeve nut 120 clockwise, and screws the nut 120 and swinging side of the door 13 onto the tubular bolt 125, the cupped T-head 126 of the bolt 125 reacting against the back face 156 of the partition wall 154, thereby pulling the swinging side of the door into the opening of the door frame 11.

Simultaneously, the sprockets 73 and 104 of the top and bottom hinge mechanisms 16 and 17 are turning clockwise, thereby turning the screws 66 and 96 in the nut housings 65 and 95 which are mounted in the nut mounting portions or heads 47 and 84 of the hinge pins 45 and 82, respectively. Consequently, the hinge side of the door 13 is pushed into the opening of the door frame 11 simultaneously with the swinging side.

When the door 13 is thrust tightly into the opening of the door frame, the parts of the common operating mechanism reach the positions shown in Figs. 59 and 71, in which the chain carried stop lug 422 has been stopped by the front plate mounted stop block 421.

In these positions of the common operating mechanism parts, the chain 403 can no longer move in the direction of the arrow 436.

Figure 70:
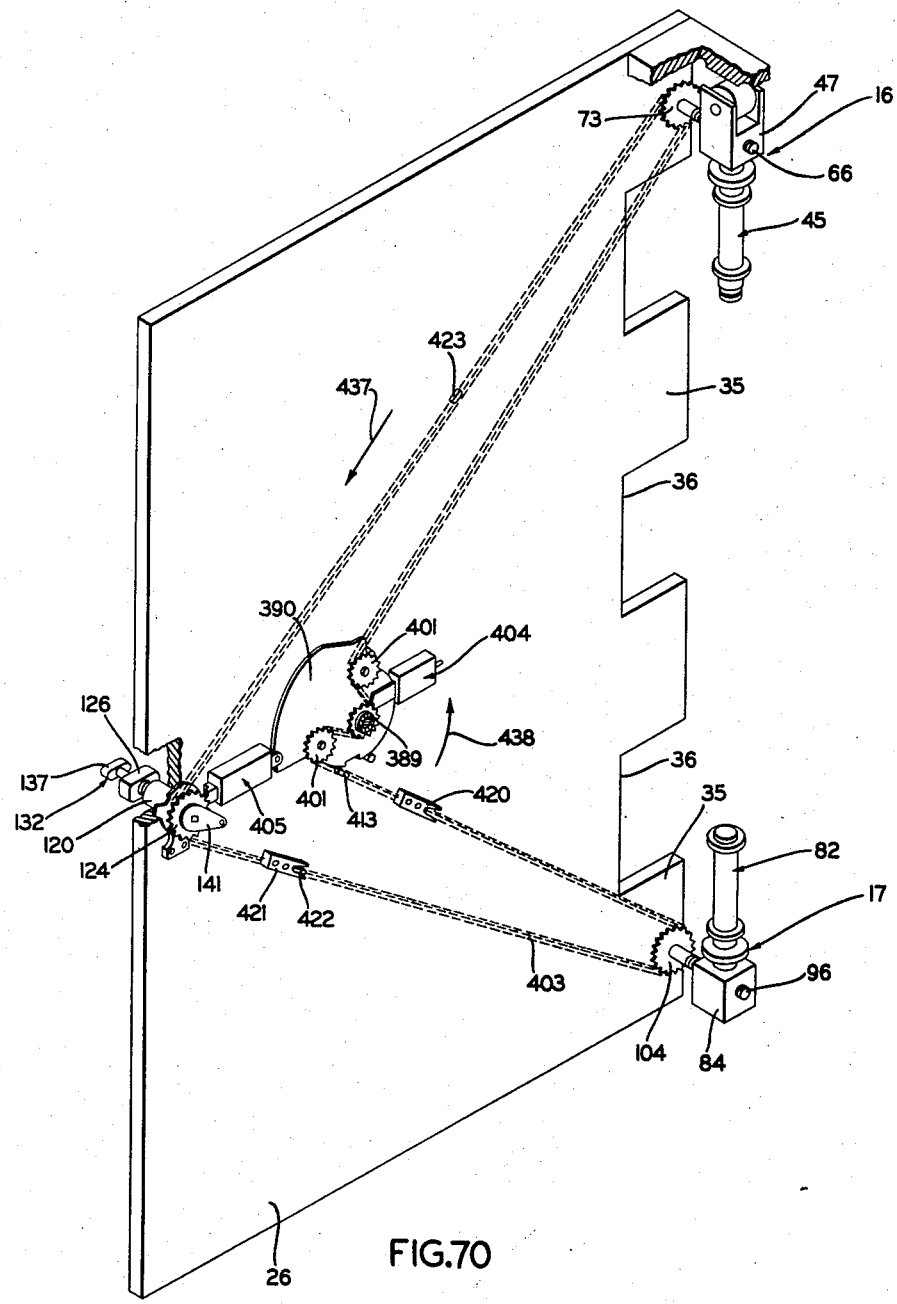
Fig. 70 is a view similar to Fig. 69, showing the relative positions of the illustrated parts, after the door has been seal-plugged in the door frame.

Further clockwise turning of the spoke handle unit 24 causes the drive sprocket 389 to ride on the chain 403, and produce a planetary movement of the sprockets 401a and 401b about the axis 393, thereby turning the cam plate 390 from the position shown in Figs. 59 and 71 to the position shown in Figs. 52 and 70.

The turning of the cam plate 390 is through an angle of 90°, and the bolt work is thereby operated to extend the bolt bars 193 and 194 to the door bolting positions shown in Fig. 35 and in other views.

During the above described pressure fitting and bolting of the door 13 in the opening of the door frame 11, the actuating lugs 413 and 423 operate respectively, as above described to release the detent 407 from engagement with the cam plate 390, and to turn the operating disk 130. Also the detent 415 is cam pushed into engagement with the sprocket 124.

The operations cycle for unbolting of the door 13, and releasing the pressure fitting thereof in the opening of the door frame 11 is substantially the reverse of the above. It is noted, however, that the chain 403 is prevented from movement in the direction of the arrow 437, Fig. 70, during the initial counter-clockwise turning in the direction of the arrow 438, Fig. 70, of the drive sprocket 389 through 90°, thereby providing for the initial counter-clockwise quarter turn of the cam plate 390 from the position shown in Fig. 70 to the position shown in Fig. 71. Thereafter the chain may move in the direction of the arrow 437.

We claim:

1. Co-acting door frame and door construction for a vault and the like, including door frame members engirdling an opening, a door dimensioned for fitting in the opening, the door frame members including opposite side members, one of the frame side members being a door supporting frame member and the other frame side member being a door engaging and disengaging frame member, the door having a hinge side and a swinging side; a first hinge mechanism and a second hinge mechanism each operatively interposed between the hinge side of the door and the door supporting frame member, the door frame members and the door having front faces, and the first hinge mechanism including a first lower bearing block secured to the door supporting frame member and extending forwardly from the front face of the door supporting frame member, a first upper bearing block secured to the hinge side of the door and extending above the first lower bearing block forwardly from the front face of the hinge side of the door, a first hinge pin and first bearing means operatively mounting the first hinge pin in the first lower bearing block, the first hinge pin having a vertical longitudinal axis spaced forwardly of the front face of the door supporting frame member, and the first bearing means operatively mounting the first hinge pin in the first lower bearing block including thrust bearing means and first radial bearing means, the first hinge pin having an upper end spaced above the first lower bearing block and an axially horizontal roller mounted for rotation on the first hinge pin upper end, the first upper bearing block including a bearing pad extending forwardly away from the front face of the hinge side of the door and having a lower horizontal bearing face supported on the roller, and the first hinge mechanism including first means resisting tilting of the door, and the second hinge mechanism including a second upper bearing block secured to the door supporting frame member and extending forwardly from the front face of the door supporting frame member, a second lower bearing block secured to the hinge side of the door and extending below the second upper bearing block forwardly from the front face of the hinge side of the door, a second hinge pin and second bearing means operatively mounting the second hinge pin in the second upper bearing block, the second hinge pin having a vertical longitudinal axis spaced forwardly of the front face of the door supporting frame member, and the second bearing means operatively mounting the second hinge pin in the second upper bearing block including second radial bearing means, and the second hinge mechanism including second means resisting tilting of the door; each hinge mechanism including a push-pull rectilinear thrust mechanism having a connection with its hinge pin and a connection with its door secured bearing block, whereby operation of the hinge push-pull rectilinear thrust mechanisms moves the hinge side of the door towards and away from the frame on the axially horizontal roller on the first hinge pin upper end; a first unit of a door and frame engaging and disengaging mechanism mounted on the swinging side of the door, and a second unit of the door and frame engaging and disengaging mechanism mounted on the door engaging and disengaging frame side member, the first and second units of the door and frame engaging and disengaging mechanism including engageable and disengageable parts, the first unit constituting a separable anchor and push-pull rectilinear thrust mechanism including means operative to engage and disengage the parts and to move the swinging side of the door towards and away from the frame when the parts are engaged.

2. Co-acting door frame and door construction for a vault and the like, as set forth in claim 1, and in which the push-pull rectilinear thrust mechanism of each of the first and second hinge mechanisms and the separable anchor and push-pull rectilinear thrust mechanism of the first unit of the door and frame engaging and disengaging mechanism, each has a rotary operating shaft; and in which a common operating mechanism has an operating connection with each of the rotary operating shafts.

3. Co-acting door frame and door construction for a vault and the like, as set forth in claim 1, and in which the push-pull rectilinear thrust mechanism of each of the first and second hinge mechanisms and the separable anchor and push-pull rectilinear thrust mechanism of the first unit of the door and frame engaging and disengaging mechanism, each has a rotary operating shaft; and in which common operating mechanism includes a toothed sprocket on each shaft, the shafts having parallel axes of rotation, and an endless chain passing externally around and engaging the toothed sprockets, and chain drive means operatively mounted on the door and having a driving engagement with the chain.

4. Co-acting door frame and door construction for a vault and the like, as set forth in claim 1, and in which the push-pull rectilinear thrust mechanism of each of the first and second hinge mechanisms and the separable anchor and push-pull rectilinear thrust mechanism of the first unit of the door and frame engaging and disengaging mechanism, each has a rotary operating shaft; and in which a common operating mechanism has an operating connection with each of the rotary operating shafts; and in which the door frame side members have rear end faces, and in which the door has rear portions, and in which bolt work is operatively mounted on the rear portions of the door, the bolt work including a bolt bar at each side of the door, bolt work operating means on the door operative to extend and retract the bolt bars to and from engagement with the rear end faces of the door frame side members, the bolt work operating means including a bolt work actuating shaft and an operating connection of the bolt work operating shaft with the common operating mechanism.

5. Co-acting door frame and door construction for a vault and the like, as set forth in claim 1, and in which the push-pull rectilinear thrust mechanism of each of the first and second hinge mechanisms and the separable anchor and push-pull rectilinear thrust mechanism of the first unit of the door and frame engaging and disengaging mechanism, each has a rotary operating shaft; and in which common operating mechanism includes a toothed sprocket on each shaft, the shafts having parallel axes of rotation, and an endless chain passing externally around and engaging the toothed sprockets, and chain drive means operatively mounted on the door and having a driving engagement with the chain, the chain drive means including a main shaft rotatable about an axis parallel with said sprocket axes, a disk on the shaft, two planetary toothed sprockets journalled on the disk and engaging the chain, the planetary sprockets having axes parallel with each other and with the axes of said other sprockets, a main drive sprocket on the main drive shaft, and the planetary sprockets being located at opposite sides of a plane passing through the axis of the main shaft, the chain angling around each of the opposite planetary sprockets and reversing around the main drive sprocket.

6. Coacting door frame and door construction for a vault and the like including door frame members engirdling an opening, a door dimensioned for fitting in the opening, the door frame members including opposite side members, one of the frame side members being a door supporting frame member and the other frame side member being a door engaging and disengaging frame member, the door having a hinge side and a swinging side, a top hinge mechanism and a bottom hinge mechanism each operatively interposed between and operatively connected to the hinge side of the door and the door supporting frame member, and the door frame members and the door having front faces; the top hinge mechanism including a first lower bearing block secured to the door supporting frame member and extending forwardly from the front face of the door supporting frame member, a first upper bearing block secured to the hinge side of the door and extending above said first lower bearing block forwardly from the front face of the hinge side of the door, a top hinge pin, bearing means operatively mounting the top hinge pin in the first lower bearing block, the top hinge pin having a vertical longitudinal axis spaced forwardly of the front face of the door supporting frame member, said bearing means including thrust bearing means for transmitting vertical loads from the hinge pin to said lower bearing block and radial bearing means spaced from said thrust bearing means for transmitting radial loads from the hinge pin to said lower bearing block, the top hinge pin having an upper end spaced above the lower bearing block and an axially horizontal roller mounted for rotation on the hinge pin upper end, the first upper bearing block including a bearing pad extending forwardly away from the front face of the hinge side of the door and having a lower horizontal bearing face supported on the hinge pin axially horizontal roller, and the top hinge mechanism including roller means operatively positioned between the first lower and upper bearing block adjacent said radial bearing means for resisting tilting of the door; the bottom hinge mechanism including a second upper bearing block secured to the door supporting frame member and extending forwardly from the front face of the door supporting frame member, a second lower bearing block secured to the hinge side of the door and extending below the second upper bearing block forwardly from the front face of the hinge side of the door, a bottom hinge pin, bearing means operatively mounting the bottom hinge pin in the second upper bearing block, the bottom hinge pin having a vertical longitudinal axis spaced forwardly of the front face of the door supporting frame member, the bottom hinge pin bearing means including radial bearing means for transmitting radial loads from said bottom hinge pin to said second upper bearing block, and the bottom hinge mechanism including roller means adjacent said bottom hinge pin radial bearing means operatively positioned between the second upper and lower bearing blocks for resisting tilting of the door.

7. Coacting door frame and door construction for a vault and the like as defined in claim 6 in which the top hinge mechanism includes a top push-pull mechanism operatively connected between the top hinge pin and the door for moving the door toward and away from the top hinge pin by movement of the upper bearing block horizontal bearing face on said hinge pin axially horizontal roller; and in which the bottom hinge mechanism includes a bottom push-pull mechanism operatively connected between the bottom hinge pin and the door for moving the door toward and away from the bottom hinge pin; and means for synchronously moving said top and bottom push-pull mechanisms whereby operation of the push-pull mechanisms moves the door toward and away from the top and bottom hinge pins and thus rectilineally with respect to the door frame.

8. Coacting door frame and door construction for a vault and the like as set forth in claim 6 in which the construction includes a door and frame engaging and disengaging mechanism having a first and a second unit; in which said first and second units are mounted one on the swinging side of the door and one on the door engaging and disengaging frame side member; in which said first unit includes latch-head means extending from the first unit mounting member, and threaded bolt and nut means operatively connected to the latch-head means and the first unit mounting member for moving the latch-head means toward and away from the first unit mounting member; in which said second unit includes a latch engaging member for engagement by the first unit latch-head means; and in which said first unit includes means for actuating the threaded bolt and nut means when the latch-head means is engaged with the latch engaging member to move the latch-head means toward and away from its mounting member and thereby move the swinging side of the door toward and away from the door engaging and disengaging frame side member.

9. Coacting door frame and door construction for a vault and the like as set forth in claim 8 in which the first unit of the door and frame engaging and disengaging mechanism is mounted on the swinging side of the door; and in which the second unit of the door and frame engaging and disengaging mechanism is mounted on the door engaging and disengaging frame side member.

10. Coacting door frame and door construction for a vault and the like including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, and a top hinge mechanism and a bottom hinge mechanism each operatively interposed between and operatively connected to the hinge side of the door member and the door supporting frame member; each hinge mechanism including a bearing block connected to the door member hinge side and a bearing block connected to the door supporting frame member, each hinge mechanism including hinge pin means rotatably mounted in one of said door member and frame member bearing blocks and mounted in the other of said door and frame bearing blocks for relative lateral movement between said pin means and at least said other bearing block, each hinge mechanism including push-pull means operatively connected with at least said hinge pin means and said other bearing block for causing relative lateral movement between said pin means and said other bearing block to move the door member hinge side rectilineally with respect to the door supporting frame member, the top hinge mechanism including thrust means between the door member bearing block and frame member bearing block for supporting the entire load of the door, and the bottom hinge mechanism including roller means between the door member bearing block and frame member bearing block for resisting tilting of the door while permitting movement of the door member hinge side rectilineally with respect to the door supporting frame member; a door and frame engaging and disengaging mechanism having a first and a second unit, said first and second units being mounted one on the swinging side of the door member and one on the door engaging and disengaging frame side member, said first unit including latch-head means extending from the first unit mounting member and threaded bolt and nut means operatively connected to the latch-head means and the first unit mounting member for moving the latch-head means toward and away from the first unit mounting member, said second unit including a latch engaging member for engagement by the first unit latch-head means, and said first unit including means for actuating the threaded bolt and nut means when the latch-head means is engaged with the latch engaging member to move the latch-head means toward and away from its mounting member and thereby move the swinging side of the door member toward and away from the door engaging and disengaging frame side member.

11. Coacting door frame and door construction for a vault and the like as set forth in claim 10 in which the first unit of the door and frame engaging and disengaging mechanism is mounted on the swinging side of the door member; and in which the second unit of the door and frame engaging and disengaging mechanism is mounted on the door engaging and disengaging frame side member.

12. Coacting door frame and door construction for a vault and the like including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, and a top hinge mechanism and a bottom hinge mechanism each operatively interposed between and operatively connected to the hinge side of the door member and the door supporting frame member; each hinge mechanism including a bearing block connected to the door member hinge side and a bearing block connected to the door supporting frame member, each hinge mechanism including hinge pin means rotatably mounted in the frame member bearing blocks and mounted in the door member bearing blocks for lateral movement of the door member toward and away from said hinge pin means, each top and bottom hinge mechanism including push-pull means operatively connected between the hinge pin means and the door member for moving the door member toward and away from said hinge pin means to move the door member hinge side rectilineally with respect to the door supporting frame member, rotatable means for actuating each push-pull mechanism, the top hinge mechanism including thrust means between the door member bearing block and frame member bearing block for supporting the entire load of the door, and the bottom hinge mechanism including roller means between the door member bearing block and frame member bearing block for resisting tilting of the door while permitting movement of the door member hinge side rectilineally with respect to the door supporting frame member; a first unit of a door and frame engaging and disengaging mechanism mounted on the swinging side of the door member, a second unit of a door and frame engaging and disengaging mechanism mounted on the door engaging and disengaging frame side member, said first unit including latch-head means extending from the door member and threaded bolt and nut means operatively connected to the latch-head means and the door member for moving the latch-head means toward and away from the door member, said second unit including a latch engaging member for engagement by the first unit latch-head means, and said first unit also including rotatable means for actuating the threaded bolt and nut means when the latch-head means is engaged with the latch engaging member to move the latch-head means toward and away from the door member and thereby move the swinging side of the door member toward and away from the door engaging and disengaging frame side member; and common operating means mounted on the door and synchronously operatively connected with the top and bottom hinge push-pull rotatable means for rotating said rotatable means to thereby move the door member hinge side rectilineally with respect to the door supporting frame member, said common operating means also being synchronously operatively connected to the door and frame engaging and disengaging rotatable actuating means for moving the latch-head toward and away from the door member to thereby move the door member swinging side toward and away from the door engaging and disengaging frame member in unison with movement of the door hinge side toward and away from the door supporting frame member.

13. Coacting door frame and door construction for a vault and the like including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, and a top hinge mechanism and a bottom hinge mechanism each separately operatively interposed between and operatively connected to the hinge side of the door member and the door supporting frame member; each hinge mechanism including a bearing block connected to the door member hinge side and a bearing block connected to the door supporting frame member, each hinge mechanism including separate hinge pin means rotatably mounted in one of said door member and frame member bearing blocks and mounted in the other of said door and frame bearing blocks for relative lateral movement between at least said pin means and said other bearing block, and each hinge mechanism including separate push-pull means operatively connected with at least said hinge pin means and said other bearing block for causing relative lateral movement between at least said hinge pin means and said other bearing block to thereby move the door member hinge side rectilineally with respect to the door supporting frame member; each separate push-pull mechanism means including a nut housing operatively connected to a screw, one of said housing and screw being connected to the hinge pin means and the other of said housing and screw being connected to said other bearing block, and one of said housing and screw being rotatable with respect to the other of said housing and screw.

14. Coacting door frame and door construction for a vault and the like as set forth in claim 13 in which the construction includes a door and frame engaging and disengaging mechanism having a first and a second unit; in which said first and second units are mounted one on the swinging side of the door member and one on the door engaging and disengaging frame side member; in which said first unit includes T-head means extending from the first unit mounting member, and threaded bolt and nut means operatively connected to the T-head means for moving the T-head means toward and away from the first unit mounting member; in which said second unit includes a member having T-slot means formed therein for engagement by the first unit T-head means; and in which said first unit includes means for actuating the threaded bolt and nut means when the T-head means is engaged with the second unit T-slot means to move the T-head means toward and away from its mounting member and thereby move the swinging side of the door member toward and away from the door engaging and disengaging frame side member.

15. Coacting door frame and door construction for a vault and the like as set forth in claim 14 in which the first unit of the door and frame engaging and disengaging mechanism is mounted on the swinging side of the door member; and in which the second unit of the door and frame engaging and disengaging mechanism is mounted on the door engaging and disengaging frame side member.

16. Coacting door frame and door construction for a vault and the like as defined in claim 13 in which the door frame side members have rear end faces, in which the door member has rear portions having sides; in which two bolt bars are operatively mounted one extending longitudinally along each of the sides of the door rear portions movable between extended and retracted positions; in which each bolt bar has tongue and groove means formed therein; in which the door rear portions each have tongue and groove means formed therein aligned and engageable with the tongue and groove means on the bolt bars at least when the bolt bars are extended; and in which the door member includes means operatively connected to the bolt bars for extending and retracting said bolt bars to and from engagement with the rear end faces of the door frame side members.

17. Coacting door frame and door construction for a vault and the like as defined in claim 13 in which the construction includes a door and frame engaging and disengaging mechanism having a first and a second unit; in which said first and second units are mounted one on the swinging side of the door member and one on the door engaging and disengaging frame side member; in which said first unit includes T-head means extending from the first unit mounting member, and threaded bolt and nut means operatively connected to the T-head means and said first unit mounting member for moving the T-head means toward and away from the first unit mounting member; in which said second unit includes a member having T-slot means formed therein for engagement by the first unit T-head means; in which said first unit also includes means for actuating the threaded bolt and nut means when the T-head means is engaged with the second unit T-slot means to move the T-head means toward and away from its mounting member and thereby move the swinging side of the door member toward and away from the door engaging and disengaging frame side member; in which the door frame side members have rear end faces; in which the door member has rear portions having sides; in which two bolt bars are operatively mounted one extending longitudinally along each of the sides of the door rear portions movable between extended and retracted positions; in which each bolt bar has tongue and groove means formed therein; in which the door rear portions each have tongue and groove means formed therein aligned and engageable with the tongue and groove means on the bolt bars at least when the bolt bars are extended; and in which the door member includes means operatively connected to the bolt bars for extending and retracting said bolt bars to and from engagement with the rear end faces of the door frame side members.

18. Coacting door frame and door construction for a vault and the like as defined in claim 17 in which the first unit of the door and frame engaging and disengaging mechanism is mounted on the swinging side of the door member; and in which the second unit of the door and frame engaging and disengaging mechanism is mounted on the door engaging and disengaging frame side member.

19. In a coacting door frame and door construction for a vault and the like of the type including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, top hinge mechanism means and bottom hinge mechanism means each operatively interposed between and operatively connected to the hinge side of the door member and the door supporting frame member mounting the hinge side of the door member on the door supporting frame member for movement of the door member hingedly with respect to the door supporting frame member and for movement of the hinge side of the door member rectilineally toward and away from the door supporting frame member, each hinge mechanism means including push-pull means mounted on the door member for moving the hinge side of the door member rectilineally with respect to the door supporting frame member and rotatable means on the door member for actuating each push-pull means, a first unit of a door and frame engaging and disengaging means mounted on the swinging side of the door and engageable with a second unit of said door and frame engaging and disengaging means mounted on the door engaging and disengaging frame side member for moving the swinging side of the door member toward and away from said frame member when the units are engaged, and rotatable means on the door member operatively connected to said first unit of the door and frame engaging and disengaging means for actuating said means to move the swinging side of the door toward and away from the door engaging and disengaging frame side member; the common operating mechanism including chain sprocket operating means on the door member operatively connected to each of the hinge mechanism push-pull rotatable means for rotating said push-pull rotatable means to move the hinge side of the door rectilineally toward and away from the door supporting frame member and also operatively connected to the door and frame engaging and disengaging rotatable means for rotating said door and frame engaging and disengaging rotatable means to move the swinging side of the door toward and away from the door engaging and disengaging frame member in unison with movement of the door hinge side toward and away from the door supporting frame member.

20. In a coacting door frame and door construction for a vault and the like of the type including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, top hinge mechanism means and bottom hinge mechanism means each operatively interposed between and operatively connected to the hinge side of the door member and the door supporting frame member mounting the hinge side of the door member on the door supporting frame member for movement of the door member hingedly with respect to the door supporting frame member and for movement of the hinge side of the door member rectilineally toward and away from the door supporting frame member, each hinge mechanism including push-pull means mounted on the door member for moving the hinge side of the door member rectilineally with respect to the door supporting frame member and rotatable means on the door member for actuating each push-pull means, a first unit of a door and frame engaging and disengaging means mounted on the swinging side of the door and engageable with a second unit of said door and frame engaging and disengaging means mounted on the door engaging and disengaging frame side member for moving the swinging side of the door member toward and away from said frame member when the units are engaged, and rotatable means on the door member operatively connected to said first unit of the door and frame engaging and disengaging means for actuating said means to move the swinging side of the door toward and away from the door engaging and disengaging frame side member, the door member having two bolt bars operatively connected thereto one extending longitudinally along each of the hinge side and swinging side of the door member movable between extended and retracted positions, and operating means on the door member including rotatable actuating means operatively connected to each of the bolt bars for extending and retracting the bolt bars to and from engagement with the door frame side members; the common operating mechanism including chain sprocket operating means on the door member operatively connected to each of the hinge mechanism push-pull rotatable means for rotating said push-pull rotatable means to move the hinge side of the door rectilineally toward and away from the door supporting frame member and also operatively connected to the door and frame engaging and disengaging rotatable means for rotating said door and frame engaging and disengaging rotatable means to move the swinging side of the door toward and away from the door engaging and disengaging frame member, and said chain sprocket operating means also being operatively connected to the bolt bar operating means rotatable means for rotating said operating means rotatable means to extend and retract the bolt bars to and from engagement with the door frame side members.

21. Coacting door frame and door construction for a vault and the like as defined in claim 20 in which the common operating mechanism means is operative alternately in a door and frame pressure tightening and door bolting cycle and a door unbolting and door and frame pressure releasing cycle; in which the chain sprocket operating means is operatively connected to the hinge mechanism push-pull rotatable means, the door and frame engaging and disengaging rotatable actuating means, and the bolt bar operating means for first rotating the hinge mechanism push-pull rotatable means to move the hinge side of the door rectilineally toward the door supporting frame member and rotating the door and frame engaging and disengaging rotatable means to move the swinging side of the door toward the door engaging and disengaging frame member, and second for rotating the bolt bar operating means rotatable means to extend the bolt bars into engagement with the door frame side members during said common operating mechanism means door and frame pressure tightening and door bolting cycle; and in which the chain sprocket operating means is operatively connected to the hinge mechanism push-pull rotatable means, the door and frame engaging and disengaging rotatable actuating means, and the bolt bar operating means for first rotating the bolt bar operating means rotatable means to retract the bolt bars from engagement with the door frame side members, and second to rotate the hinge mechanism push-pull rotatable means to move the hinge side of the door rectilineally away from the door supporting frame member and rotate the door and frame engaging and disengaging rotatable means to move the swinging side of the door away from the door engaging and disengaging frame member during a door unbolting and door and frame pressure releasing cycle.

22. In a coacting door frame and door construction for a vault and the like of the type including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, top hinge mechanism means and bottom hinge mechanism means each operatively interposed between and operatively connected to the hinge side of the door member and the door supporting frame member mounting the hinge side of the door member on the door supporting frame member for movement of the door member hingedly with respect to the door supporting frame member and for movement of the hinge side of the door member rectilineally toward and away from the door supporting frame member, each hinge mechanism including push-pull means mounted on one of the door member and door frame members for moving the hinge side of the door member rectilineally with respect to the door supporting frame member and rotatable means on said one of the door member and door frame members for actuating each push-pull means, a first unit of a door and frame engaging and disengaging means mounted on the swinging side of the door and engageable with a second unit of said door and frame engaging and disengaging means mounted on the door engaging and disengaging frame side member for moving the swinging side of the door member toward and away from said frame member when the units are engaged, and rotatable means on said one of the door member and door frame members operatively connected to one of said units of the door and frame engaging and disengaging means for actuating said means to move the swinging side of the door toward and away from the door engaging and disengaging frame side member; the common operating mechanism including chain sprocket operating means on said one of the door member and door frame members operatively connected to each of the hinge mechanism push-pull rotatable means for rotating said push-pull rotatable means to move the hinge side of the door rectilineally toward and away from the door supporting frame member and also operatively connected to the door and frame engaging and disengaging rotatable means for rotating said door and frame engaging and disengaging rotatable means to move the swinging side of the door toward and away from the door engaging and disengaging frame member.

23. Coacting door frame and door construction for a vault and the like including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, and a top hinge mechanism and a bottom hinge mechanism each operatively interposed between and operatively connected to the hinge side of the door member and the door supporting frame member; each hinge mechanism including hinge pin means rotatably mounted on one of said door member and door supporting frame member and mounted on the other of said door member and door supporting frame member for relative lateral movement between at least said hinge pin means and said other of the door member and door supporting frame member, and each hinge mechanism including push-pull mechanism means operatively connected with at least said hinge pin means and said other of the door member and door supporting frame member for causing relative lateral movement between at least said hinge pin means and said other of the door member and door supporting frame member to move the door member hinge side rectilineally with respect to the door supporting frame member; and an axially horizontal roller mounted for rotation on an upper end of one of said top and bottom hinge mechanism means hinge pin means, the door member having a bearing pad mounted thereon, said bearing pad having a lower horizontal bearing face in contact with the one hinge pin means axially horizontal roller for supporting the door member and permitting movement of the door member hinge side rectilineally with respect to the door supporting frame member.

24. Coacting door frame and door construction for a vault and the like including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, and a top hinge mechanism and a bottom hinge mechanism each separately operatively interposed between and operatively connected to the hinge side of the door member and the door supporting frame member; each hinge mechanism including separate hinge pin means rotatably mounted laterally stationary on one of said door member and door supporting frame member and mounted on the other of said door member and door supporting frame member for relative lateral movement between said hinge pin means and said other of the door member and door supporting frame member, and each hinge mechanism including separate push-pull mechanism means operatively connected with said hinge pin means and said other of the door member and door supporting frame member for causing relative lateral movement between said hinge pin means and said other of the door member and door supporting frame member to move the door member hinge side rectilineally with respect to the door supporting frame member; each separate push-pull mechanism means including a nut housing operatively connected to a screw, one of the said nut housing and screw being connected to the hinge pin means and the other of the said nut housing and screw being connected to said other of the door member and door supporting frame member, and one of the said nut housing and screw being rotatable with respect to the other of the said nut housing and screw.

25. Coacting door frame and door construction for a vault and the like as defined in claim 24 in which an axially horizontal roller is mounted for rotation on an end of one of said top and bottom hinge mechanism hinge pin means; in which said other of the door member and door supporting frame member has a bearing pad mounted thereon, and said bearing pad having a lower horizontal bearing face on contact with the one hinge pin means axially horizontal roller for supporting the door member and permitting movement of the door member hinge side rectilineally with respect to the door supporting frame member.

26. Coacting door frame and door construction for a vault and the like including door frame members engirdling an opening, a door member dimensioned for fitting in the opening, the door frame members including opposite side members, one of the frame side members being a door supporting frame member and the other frame side member being a door engaging and disengaging frame member, the door member having a hinge side and a swinging side, and a top hinge mechanism and a bottom hinge mechanism each operatively interposed between and operatively connected to the hinge side of the door member and the door supporting frame member; each hinge mechanism including a bearing block connected to the door member hinge side and a bearing block connected to the door supporting frame member, each hinge mechanism including hinge pin means rotatably mounted in said frame member bearing blocks and mounted in said door member bearing blocks for relative lateral movement between said pin means and said door member bearing block, each hinge mechanism including push-pull mechanism means operatively connected with said hinge pin means and said door member bearing block for causing relative lateral movement between said pin means and said door member bearing block to move the door member hinge side rectilineally with respect to the door supporting frame member, the top hinge mechanism including thrust means between the door member bearing block and frame member bearing block for supporting the entire load of the door, and the bottom hinge mechanism including roller means between the door member bearing block and frame member bearing block for resisting tilting of the door while permitting movement of the door member hinge side rectineally with respect to the door supporting frame member; a first unit of a door and frame engaging and disengaging mechanism mounted on said swinging side of the door member, a second unit of a door and frame engaging and disengaging mechanism mounted on said door engaging and disengaging frame side member, said first unit including latch-head means extending from the door member and threaded bolt and nut means operatively connected to the latch-head means and the door member for moving the latch-head means toward and away from the door member, said second unit including a latch engaging member for engagement by the first unit latch-head means, and said first unit including means for actuating the threaded bolt and nut means when the latch-head means is engaged with the latch engaging member to move the latch-head means toward and away from the door member and thereby move the swinging side of the door member toward and away from the door engaging and disengaging frame side member; and the door frame side members having rear end faces, the door member having rear portions having sides, two bolt bars operatively mounted one extending longitudinally along each of the sides of the door rear portions movable between extended and retracted positions, each bolt bar having tongue and groove means formed therein, the door rear portions each having tongue and groove means formed therein aligned and engageable with the tongue and groove means on the bolt bars at least when the bolt bars are extended, and the door member including means operatively connected to the bolt bars for extending and retracting said bolt bars to and from engagement with the rear end faces of the door frame side members.

27. Coacting door frame and door construction for a vault and the like as defined in claim 26 in which each hinge mechanism includes rotatable means for actuating each push-pull mechanism means; in which the door and frame engaging and disengaging mechanism first unit actuating means is rotatable; in which the means on the door member operatively connected to the bolt bars includes rotatable actuating means; and in which common operating mechanism means is mounted on the door member including chain sprocket operating means operatively connected to each of the hinge mechanism push-pull rotatable means for rotating said push-pull rotatable means to move the hinge side of the door rectilineally toward and away from the door supporting frame member and also operatively connected to the door and frame engaging and disengaging rotatable actuating means for rotating said door and frame engaging and disengaging rotatable means to move the swinging side of the door toward and away from the door engaging and disengaging frame member, and said chain sprocket operating means also being operatively connected to the bolt bar operating means rotatable means for rotating said operating means rotatable means to extend and retract the bolt bars to and from engagement with the door frame side members.

28. Coacting door frame and door construction for a vault and the like as defined in claim 27 in which the common operating mechanism means is operative alternately in a door and frame pressure tightening and door bolting cycle and a door unbolting and door and frame pressure releasing cycle; in which the chain sprocket operating means is operatively connected to the hinge mechanism push-pull rotatable means, the door and frame engaging and disengaging rotatable actuating means, and the bolt bar operating means for first rotating the hinge mechanism push-pull rotatable means to move the hinge side of the door rectilineally toward the door supporting frame member and rotating the door and frame engaging and disengaging rotatable means to move the swinging side of the door toward the door engaging and disengaging frame member, and second for rotating the bolt bar operating means rotatable means to extend the bolt bars into engagement with the door frame side members during said common operating mechanism means door and frame pressure tightening and door bolting cycle; and in which the chain sprocket operating means is operatively connected to the hinge mechanism push-pull rotatable means, the door and frame engaging and disengaging rotatable actuating means, and the bolt bar operating means for first rotating the bolt bar operating means rotatable means to retract the bolt bars from engagement with the door frame side members, and second to rotate the hinge mechanism push-pull rotatable means to move the hinge side of the door rectilineally away from the door supporting frame member and rotate the door and frame engaging and disengaging rotatable means to move the swinging side of the door away from the door engaging and disengaging frame member during a door unbolting and door and frame pressure releasing cycle.

29. Vault door construction including a door frame member having a door opening, a door member for the opening, hinge means operatively connected to the door member and door frame member, said hinge means including an axially vertical hinge pin rotatably mounted axially stationary in one of the door frame and door members, a first roller and roller contacting bearing pad means operatively connected between the hinge pin and the other of said door frame and door members for supporting the door member for rectilineal movement with respect to the door frame member, and second roller and roller contacting bearing pad means operatively connected between the hinge pin and said other of said door frame and door members for resisting tilting of the door member with respect to the frame member at any position of rectilineal movement of the door with respect to the frame member.

30. Vault door construction including a door frame member having a door opening, a door member for the opening, hinge means operatively connected to the door member and door frame member, said hinge means including a first hinge mechanism and a second hinge mechanism; the first hinge mechanism including a first axially vertical hinge pin rotatably mounted axially stationary in one of the door frame and door members, a first roller and roller contacting bearing pad means operatively connected between the first hinge pin and the other of said door frame and door members for supporting the door member for rectilineal movement with respect to the door frame member, and second roller and roller contacting bearing pad means operatively connected between the first hinge pin and said other of said door frame and door members for resisting tilting of the door member with respect to the frame member at any position of rectilineal movement of the door with respect to the frame member; and the second hinge mechanism including a second axially vertical hinge pin rotatably mounted axially stationary in said one of the door frame and door members, and a third roller and roller contacting bearing pad means operatively connected between the second hinge pin and said other of said door frame and door members for resisting tilting of the door member with respect to the frame member at any position of rectilineal movement of the door with respect to the frame member.

References Cited in the file of this patent

UNITED STATES PATENTS

| Number | Name | Date |
|---|---|---|
| 331,480 | Diebold | Dec. 1, 1885 |
| 370,472 | Gross | Sept. 27, 1887 |
| 423,149 | Gross | Mar. 11, 1890 |
| 522,103 | Burton et al. | June 26, 1894 |
| 679,377 | Hibbard | July 30, 1901 |
| 793,703 | Williams | July 4, 1905 |
| 1,235,808 | Johnson | Aug. 7, 1917 |
| 1,253,655 | Wiederrecht | Jan. 15, 1918 |
| 1,376,355 | Phipps | Apr. 26, 1921 |
| 2,347,705 | Mosler | May 2, 1944 |
| 2,618,010 | Helz | Nov. 18, 1952 |